(12) United States Patent
Mimassi

(10) Patent No.: US 11,651,371 B2
(45) Date of Patent: May 16, 2023

(54) ZERO-STEP USER RECOGNITION AND BIOMETRIC ACCESS CONTROL

(71) Applicant: RockSpoon, Inc., San Jose, CA (US)

(72) Inventor: Nagib Georges Mimassi, Palo Alto, CA (US)

(73) Assignee: ROCKSPOON, INC, San Jose, CA (US)

( * ) Notice: Subject to any disclaimer, the term of this patent is extended or adjusted under 35 U.S.C. 154(b) by 0 days.

(21) Appl. No.: 17/750,937

(22) Filed: May 23, 2022

(65) Prior Publication Data

US 2022/0292517 A1    Sep. 15, 2022

Related U.S. Application Data

(63) Continuation-in-part of application No. 17/320,355, filed on May 14, 2021, now Pat. No. 11,341,501, which is a continuation of application No. 16/950,101, filed on Nov. 17, 2020, now Pat. No. 11,010,764, which is a continuation-in-part of application No. 17/005,038, filed on Aug. 27, 2020, now Pat. No. 11,232,426, which is a continuation-in-part of application No. 16/796,342, filed on Feb. 20, 2020, now Pat. No. 10,803,442.

(60) Provisional application No. 62/964,413, filed on Jan. 22, 2020, provisional application No. 62/964,422, filed on Jan. 22, 2020, provisional application No. 62/938,817, filed on Nov. 21, 2019.

(51) Int. Cl.
*G06Q 20/40* (2012.01)
*G06F 21/32* (2013.01)
*G06Q 20/26* (2012.01)

(52) U.S. Cl.
CPC ....... *G06Q 20/40145* (2013.01); *G06F 21/32* (2013.01); *G06Q 20/26* (2013.01); *G06Q 20/409* (2013.01)

(58) Field of Classification Search
CPC ... G06Q 20/4015; G06Q 20/409; G06F 21/32
USPC ..................................................... 705/35–45
See application file for complete search history.

(56) References Cited

U.S. PATENT DOCUMENTS

| | | | |
|---|---|---|---|
| 8,630,906 B2 | 1/2014 | Fisher | |
| 8,751,391 B2 | 6/2014 | Freund | |
| 2004/0218070 A1* | 11/2004 | Hamalainen | G06F 21/32 348/239 |
| 2014/0363058 A1* | 12/2014 | Emmett | G06V 40/193 382/117 |
| 2015/0067808 A1* | 3/2015 | Varghese | G06F 21/32 726/7 |
| 2015/0120547 A1 | 4/2015 | Ghosh et al. | |

(Continued)

*Primary Examiner* — Robert R Niquette
(74) *Attorney, Agent, or Firm* — Galvin Patent Law LLC; Brian R. Galvin

(57) ABSTRACT

A zero-step user recognition and biometric access control system and method which comprises various sensors configured to capture a plurality of biometric data associated with a user, a database configured to store a plurality of user information including identifiable biometric data associated with the user, a biometric verification server configured to receive a plurality of biometric data from the sensors and user information from the database, and to return a confirmation of the user's identity, in order to provide real-time user recognition, authentication, and access control using biometric data.

20 Claims, 18 Drawing Sheets

(56) References Cited

U.S. PATENT DOCUMENTS

| | | | |
|---|---|---|---|
| 2015/0294139 A1* | 10/2015 | Thompson | G06K 9/6292 |
| | | | 382/112 |
| 2016/0012218 A1* | 1/2016 | Perna | G06F 16/5838 |
| | | | 726/18 |
| 2016/0306954 A1* | 10/2016 | Hawkins | G07C 9/37 |
| 2017/0109570 A1* | 4/2017 | Finkelstein | G06F 21/6245 |
| 2017/0255767 A1* | 9/2017 | Ren | G06V 40/165 |
| 2019/0042835 A1* | 2/2019 | Mostafa | G06F 21/32 |
| 2019/0188509 A1* | 6/2019 | He | G06T 7/0002 |
| 2020/0034847 A1* | 1/2020 | Tuneld | G06Q 20/321 |
| 2020/0042685 A1* | 2/2020 | Tussy | G06F 21/32 |
| 2022/0147605 A1* | 5/2022 | Tussy | G06V 10/17 |
| 2022/0277065 A1* | 9/2022 | Patel | G06F 21/32 |

\* cited by examiner

901 Each customer mobile device shows nearby customer devices also using the payment system

902 Customers dining together form a group by selecting one another (or accepting a group formation created by one or more of them)

903 Each customer's device displays a copy of the itemized bill on one side of the screen, and a photo (or other representational image) of each other customer in the group on the other side of the screen

904 One or more of the customers in the group assigns payment by clicking and dragging items from the itemized bill to the photo (or image) of the customer responsible for paying for that item

905 When the group is finished assigning payments, each customer approves his/her proposed payment assignments, with unassigned items being distributed equally among the customers in the group

906 After all customers in the group have approved their payment assignments, the payment system processes payments from each customer's account according to the approved payment assignments

Fig. 9

ZERO-STEP USER RECOGNITION AND BIOMETRIC ACCESS CONTROL

Priority is claimed in the application data sheet to the following patents or patent applications, the entire written description of each of which is expressly incorporated herein by reference in its entirety:

Ser. No. 17/320,355
Ser. No. 16/950,101
Ser. No. 17/005,038
Ser. No. 16/796,342
62/938,817
62/964,413
62/964,422

BACKGROUND

Field of the Art

The disclosure relates to the field of payment systems, and more particularly to the field of automated payment systems using wireless-enabled mobile devices.

Discussion of the State of the Art

Wireless mobile computing devices (e.g., smartphones) have enabled wireless payment technologies wherein the consumer makes a payment by receiving a payment request on the customer's mobile device and authorizing the payment by tapping an icon on the screen. However, such technologies require the customer to remove his or her mobile device from a pocket or bag, turn on the device, enter a passcode to open the device, and tap on the screen to approve payment or scan a QR code shown on the screen. These steps are inefficient and interfere with the business/customer interaction, as the customer's attention is focused on his or her mobile device instead of the interaction with the business environment or the business' employees. These systems do not provide touchless payments with sufficient security, are not compatible with existing business methodologies and cultures, and interfere with the business/customer interaction. Further, biometric security in the field of mobile devices frequently relies on fingerprint analysis or, again, requires a user to pull out their phone to scan their face, further interfering with the business/customer interaction.

What is needed is a system and method for zero-step user recognition and biometric access control which provides real-time user authentication and which can enable touchless payments between a user and a business enterprise.

SUMMARY

Accordingly, the inventor has conceived and reduced to practice, a zero-step user recognition and biometric access control system and method which comprises various sensors configured to capture a plurality of biometric data associated with a user, a database configured to store a plurality of user information including identifiable biometric data associated with the user, a biometric verification server configured to receive a plurality of biometric data from the sensors and user information from the database, and to return a confirmation of the user's identity, in order to provide real-time user recognition, authentication, and access control using biometric data.

According to a preferred embodiment, a system for zero-step user recognition and biometric access control is disclosed, comprising: at least one of either or both of an audio or video input device; and a database configured to store a plurality of user profiles, wherein each of the plurality of user profiles comprises at least a biometric template and a photograph of the user; and a biometrics verification server comprising a first memory, a first processor, and a first plurality of programming instructions stored in the first memory, and operating on the first processor, wherein the first plurality of programming instructions, when operating on the first processor, cause the biometrics verification server to: receive audio data and image data associated with a user from the input device over a network; process the received audio data as behavioral biometric data; process the received image data as physiological biometric data; extract unique facial features from the physiological biometric data, the extracted facial features comprising a first set of user-specific biometric characteristic data; extract unique speech features from the behavioral biometric data, the extracted speech features comprising a second set of user-specific biometric characteristic data; compare the first set of user-specific biometric characteristic data with the plurality of photographs stored in the database; if the first set of user-specific biometric characteristic data does not match any stored photographs, create a new user profile and store the first set of user-specific biometric characteristic data in a biometric template associated with the new user profile; or if the first set of user-specific biometric characteristic data does match a stored photograph, retrieve a biometric template associated with the matched photograph; and indicate a positive or negative physiological match; compare the second set of user-specific biometric characteristic data with the biometric template associated with the matched photograph; if the second set of user-specific biometric characteristic data does not match any stored photographs, indicate a negative behavioral match; or if the first set of user-specific biometric characteristic data does match a stored biometric template, indicate a positive behavioral match; and responsive to the indication of the positive physiological match and the positive behavioral match, confirm the user's identity.

According to another preferred embodiment, A method for zero-step user recognition and biometric access control, comprising the steps of: using at least one of either or both of an audio or video input device to capture audio data and image data; storing, in a database, a plurality of user profiles, wherein each of the plurality of user profiles comprises at least a biometric template and a photograph of the user; receiving audio data and image data associated with a user from the input device over a network; processing the received audio data as behavioral biometric data; processing the received image data as physiological biometric data; extracting unique facial features from the physiological biometric data, the extracted facial features comprising a first set of user-specific biometric characteristic data; extracting unique speech features from the behavioral biometric data, the extracted speech features comprising a second set of user-specific biometric characteristic data; comparing the first set of user-specific biometric characteristic data with the plurality of photographs stored in the database; if the first set of user-specific biometric characteristic data does not match any stored photographs, creating a new user profile and storing the first set of user-specific biometric characteristic data in a biometric template associated with the new user profile; or if the first set of user-specific biometric characteristic data does match a stored photograph, retrieving a biometric template associated with the matched photograph; and indicating a positive or negative physiological match; comparing the second set of user-specific biometric characteristic data with the biometric template associated with the matched photograph; if the second set of user-specific biometric characteristic data does not match any stored photographs, indicating a negative behavioral match; or if the first set of user-specific biometric characteristic data does match a stored biometric template, indicating a positive behavioral match; and responsive to the indication of the positive physiological match and the positive behavioral match, confirming the user's identity.

According to an aspect of an embodiment, the first set of user-specific biometric characteristic data comprises information about the distance between the user's eyes, the depth of the user's eye sockets, the distance from the user's forehead to chin, the shape of the user's cheekbones, and the contours of the user's lips, ears, and chin.

According to an aspect of an embodiment, the second set of user-specific biometric characteristic data comprises information about the pitch, loudness, tone, and frequency range of a user's voice.

According to an aspect of an embodiment, a payment facilitation device comprising a second memory, a second processor, and a second plurality of programming instructions stored in the second memory, and operating on the second processor, wherein the second plurality of programming instructions, when operating on the second processor, cause the payment facilitation device to: detect a registered wireless mobile device; establish a wireless connection with the registered wireless mobile device; obtain a device identifier for the registered wireless mobile device; send the device identifier to a payment facilitation server; receive the confirmation of user identity from the biometric verification server; retrieve the confirmed user's user profile from the database; display the photograph of the user associated with the registered wireless mobile device for visual confirmation of the identity of the customer; transmit transaction details to the registered wireless mobile device for approval, the transaction details comprising a transaction amount; receive authentication of the transaction details from the customer mobile device; and send the transaction details to the payment facilitation server for processing of the transaction.

According to an aspect of an embodiment, the payment facilitation server comprising a third memory, a third processor, and a third plurality of programming instructions stored in the third memory, and operating on the third processor, wherein the third plurality of programming instructions, when operating on the third processor, cause the payment facilitation server to: receive the device identifier from the payment facilitation device; check the prepaid account balance of the user associated with the registered wireless mobile device; if the account balance exceeds transaction amount, deduct the transaction amount from the account balance; or if the transaction amount exceeds the account balance, send the transaction details to a payment processor for processing.

According to an aspect of an embodiment, a unified communications system is used as a common intermediary device through which the payment facilitation device, the payment facilitation server, and registered wireless mobile device communicate.

According to an aspect of an embodiment, the at least one audio or video input device and biometrics verification server are all located on at least one computer device that is connected to a local network.

According to an aspect of an embodiment, the biometrics verification server receives input and sends output over the Internet.

According to an aspect of an embodiment, the confirmation of a user's identity is used to provide access to controlled materials.

According to an aspect of an embodiment, the controlled materials comprise at least one of a hardware, software, and physical location.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 9 is a flow diagram showing the steps of an exemplary method for bill splitting among customers.

DETAILED DESCRIPTION

Figure 1:
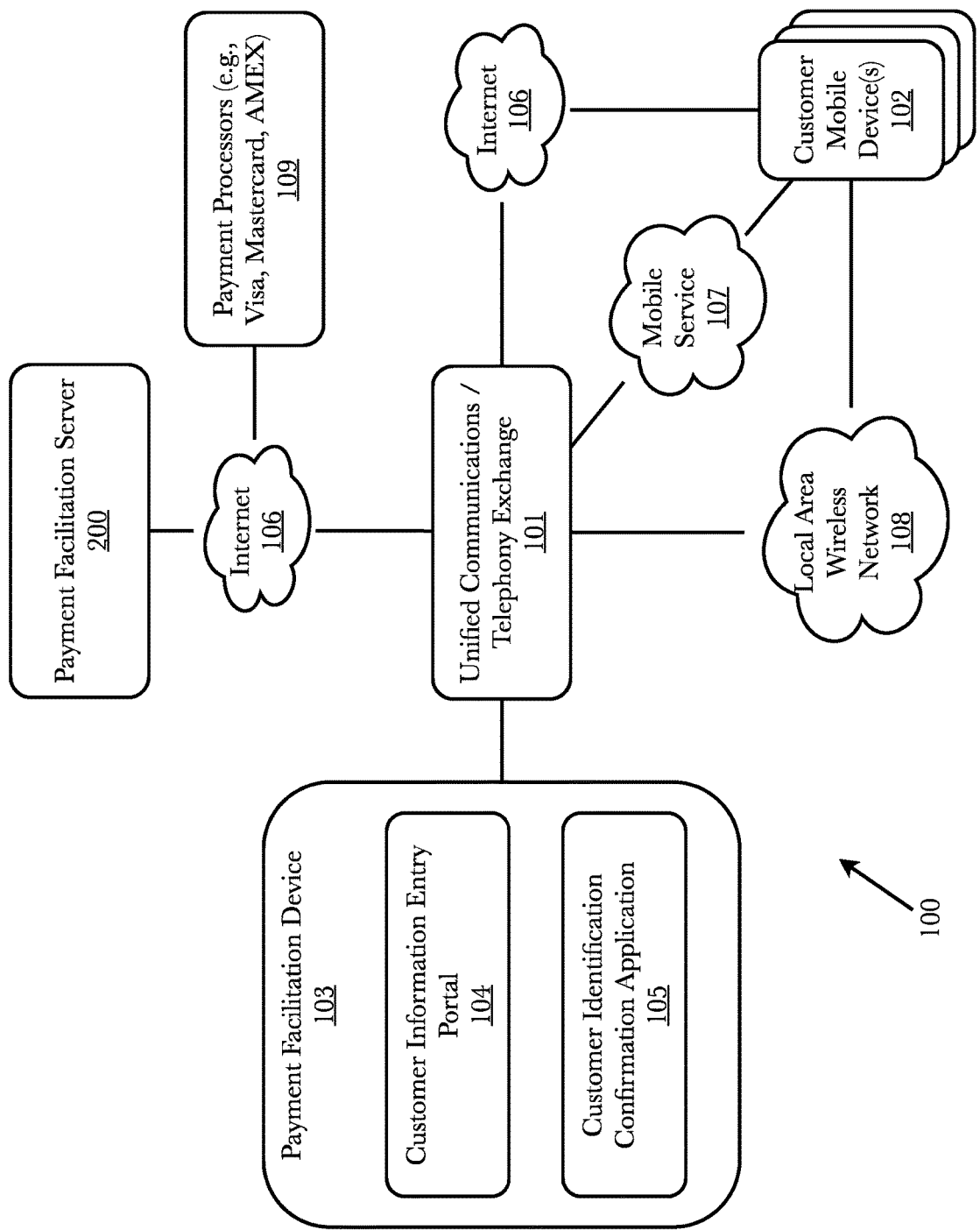
FIG. 1 is a block diagram illustrating an exemplary system architecture for a zero-step authentication system.

The inventor has conceived, and reduced to practice, a zero-step user recognition and biometric access control system and method which comprises various sensors configured to capture a plurality of biometric data associated with a user, a database configured to store a plurality of user information including identifiable biometric data associated with the user, a biometric verification server configured to receive a plurality of biometric data from the sensors and user information from the database, and to return a confirmation of the user's identity, in order to provide real-time user recognition, authentication, and access control using biometric data.

Because the customer does not have to focus on his or her mobile device, the customer is free to interact naturally with the business environment and with employees of the business. For example, the customer is free to look around to experience the store's ambiance, which will tend to create a positive impression on the customer, and increase the likelihood that the customer will wish to return. Further, the customer is free to look at and speak with the business' employees, which facilitates personal interactions and relationships, making the customer feel more welcome and also increasing the likelihood that the customer will wish to return. These natural interactions are hindered by the handling and use of mobile phones, where the customer's attention is drawn away from the business environment and its employees in order to focus on the details of making or approving the transaction using his or her mobile device.

While the examples herein primarily discuss authorization of payments, the invention is not limited to authorization of monetary transactions, and can be used for authorization and transfer of any asset, or representation of an asset, that can be transferred electronically, for example: electronic transfers of real currency (credit card charges, bank transfers and payments, etc.), transfers of blockchain-based currencies such as Bitcoin, and transfers of digitized contracts or promises to pay or transfer physical assets (including, but not limited to, IOUs, certificates of ownership of stocks or other securities, and deeds for real estate).

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Business establishment" or "place of business" as used herein mean the location of any business entity with which customers may transact business. Typically, this will be a physical location where customers may enter the location and transact business directly with employees of the business, but may also be a business without a physical location such as an online or telephone order retailer. Many examples herein use a restaurant as the business establishment, but the invention is not limited to use in restaurants, and is applicable to any business establishment.

The term "network" as used herein means any communication connection between two or more computing devices, whether such connection is made directly (e.g., from one device containing a Bluetooth radio to another device containing a Bluetooth radio) or through an intermediary device such as a router, where a number of devices connected to the router may all communicate with one another.

Conceptual Architecture

FIG. 1 is a block diagram illustrating an exemplary system architecture 100 for a zero-step authentication system. The primary components of the system are a payment facilitation device 103, a unified communications device or telephony exchange system (UC system) 101, and a payment facilitation server 200. Components or services that may connect to or be accessed by the system include wireless customer mobile devices 102, and payment processors 109. The payment facilitation device 103 is a computing device located at a business establishment that is connected (wired or wirelessly) to a UC system 101. The payment facilitation device 103 may be wired, or wireless, or both, depending on the implementation of a given embodiment. While a payment facilitation device 103 and UC system 101 are specified in this embodiment, it is not required that they be precisely in this configuration, and other configurations are possible, including a non-SIP computing device connected to a network without a US system 101. The payment facilitation device 103 comprises a screen (not shown) and applications for a customer information entry portal 104 and a customer identification confirmation application 105. The payment facilitation device 103 may be a mobile computing device like a mobile phone or tablet computer or may be a desktop or tabletop computing device.

The customer information entry portal 104 is an application on the payment facilitation device 103 that allows an employee of the business to enter customer details such as name, telephone number, device identifier, bank, debit, or credit card details, payment preferences, and, if necessary, customer account refill limits and customer account refill amounts. The device identifier may be any information that allows the system to identify the customer mobile device 102, including, but not limited to, a mobile access control (MAC) address (e.g., a MAC address for the device's WiFi radio, a MAC address for the device's Bluetooth radio, etc.), the device's 102 serial number, the device's mobile equipment identifier (MEID) or international mobile equipment identity (IMEI) number, the integrated circuit card identifier (ICCID) of the subscriber identity module (SIM) card inserted into the customer mobile device 102, and the device's 102 secure element identification (SEID) number.

The customer identification and confirmation application 105 is an application that provides security in financial transactions by allowing the employee of the business to visually confirm the identity of the customer making a transaction. For example, the payment facilitation device at a particular business location may be connected to multiple customer devices simultaneously. The customer identification and confirmation application 105 may display a photo of the user (customer) of each such connected customer device, and the employee may select the device of the customer making the transaction by clicking on the customer's photo as displayed by the customer identification and confirmation application 105 on the payment facilitation device 103.

The UC system 101 is a device or service (e.g., online service) that integrates different methods of communication (e.g., phone calls, video calls, short message service (SMS), instant messaging (chat), email) and allows for all of those different methods of communication to be accessed through a computing device such as a mobile phone or tablet computer. A UC system 101 is the modern, and much more flexible and powerful, form of a private branch exchange (PBX) telephone equipment system that allowed businesses to connect multiple internal telephones to a single incoming telephone line. In this example, the UC system 101 acts as the interface between the payment facilitation device 103, the customer mobile devices 102, and the payment facilitation server 200.

A customer mobile device 102 may be connected to the system via any wireless network connection, for example through the Internet 106, a mobile (cellular) network 107, or through a local wireless network 108 such as WiFi, Bluetooth, etc. In the case of remote connections such as those made through the Internet 106 or mobile service 107, the location of a customer mobile device 102 and its location relative to the payment facilitation device 103 or other customer mobile devices 102 may be established through use of the device's satellite positioning system hardware (e.g., GPS, GLONASS, Galileo), by identifying the location of an intermediary device to which the device is connected (e.g., a WiFi router, etc. In the case of local connections, which typically use short range wireless transmissions, it may not be necessary to determine the location of the mobile customer device 102 because the short range of wireless communications establishes that the payment facilitation device 103 or other mobile customer devices are nearby. For example, when using a Bluetooth Class 2 connection to connect to other devices, it will be apparent that the other devices are nearby because Bluetooth Class 2 has an effective range on the order of 10 meters.

In a typical scenario, the first time a customer enters a business establishment with a customer mobile device 102, an employee of the business establishment will enter the customer's information using the customer information entry portal 104 and register the customer mobile device 102 using the customer mobile device's 102 identification. When a customer mobile device 102 enters a business establishment, the payment facilitation device 103 and customer mobile device 102 will automatically detect each other and establish a network connection. The payment facilitation device 103 will recognize the customer mobile device 102 using the customer mobile device's identifier. As the customer makes an order, the business's employee will confirm the identity of the customer using the customer identification confirmation application 105. The payment facilitation device connects to the payment facilitation server 200, either directly or through the UC system 101, forwards the customer information and order information to the payment facilitation server 200. The payment facilitation server 200, checks the customer's account and either deducts and appropriate amount from the customer's prepaid account or sends the payment details to a payment processor 109 for processing. Once the payment is processed, the payment facilitation server 200 sends a confirmation of the payment either to the payment facilitation device 103, the customer mobile device 102, or both. In a scenario where the customer is in a remote location from the business establishment (e.g., a phone order or online order), the process is much the same except that the first time customer information entry and mobile device registration occurs remotely, and the employee does not visually identify the customer (although other methods of identifying the customer may apply, such as personal identification number (PIN) codes, voice print identification, telephone number identification, or customer mobile device 102 identifiers).

Figure 2:
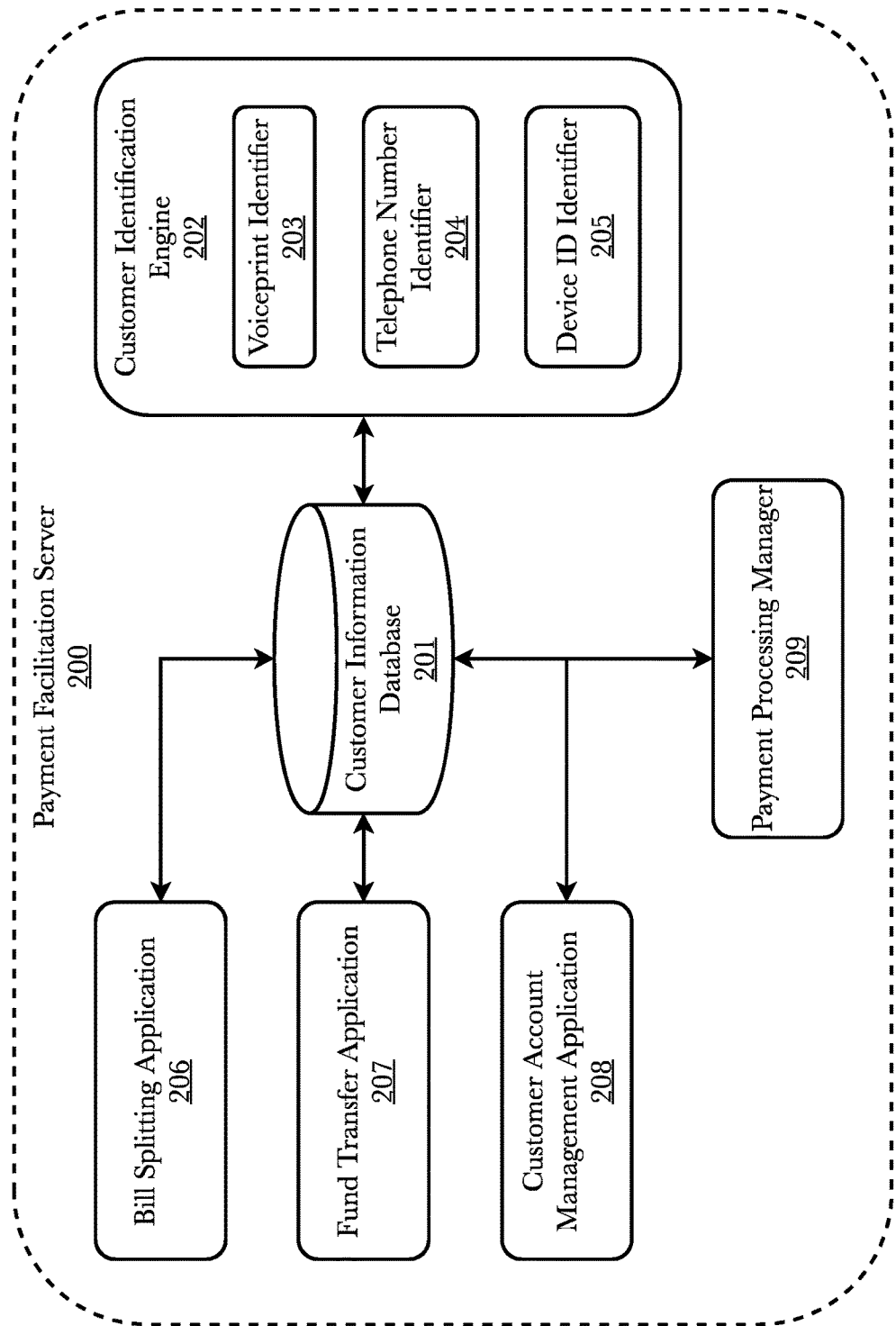
FIG. 2 is a block diagram illustrating an exemplary architecture for an aspect of zero-step authentication system, the payment facilitation server.

FIG. 2 is a block diagram illustrating an exemplary architecture for an aspect of zero-step authentication system, the payment facilitation server 200. The payment facilitation server 200 manages customer information and payments from multiple customers. In this example, the payment facilitation server comprises a customer information database 201, a customer identification engine 202, a payment processing manager 209, and one or more applications for managing bill splitting, fund transfers, and account information. Note that, in some embodiments, the bill splitting and fund transfer applications may be applications on the customer mobile device 102 instead of on the payment facilitation server 200. As the payment facilitation server receives customer information and device registrations, it stores them in a customer information database. Such customer information may comprise customer details such as name, telephone number, device identifier, bank, debit, or credit card details, payment preferences, and, if necessary, customer account refill limits and customer account refill amounts. The device identifier may be any information that allows the system to identify the customer mobile device 102, including, but not limited to, a mobile access control (MAC) address (e.g., a MAC address for the device's WiFi radio, a MAC address for the device's Bluetooth radio, etc.), the device's 102 serial number, the device's mobile equipment identifier (MEID) or international mobile equipment identity (IMEI) number, the integrated circuit card identifier (ICCID) of the subscriber identity module (SIM) card inserted into the customer mobile device 102, and the device's 102 secure element identification (SEID) number.

The customer identification engine 202 provides additional security by confirming the identity of the customer before processing payments. In this example, the customer identification engine 202 has three separate identification methods, a voiceprint identifier 203, a telephone number identifier 204, and a device ID identifier 205. The voiceprint identifier 203 can provide confirmations of customer identities either by matching voice samples of specific words and phrases provided by the customer as during account creation and device registration or, in a more sophisticated version, may match the customer's voice to any spoken words and phrases using machine learning algorithms. The telephone number identifier 204 receives caller identification (caller ID) information from the UC system 101, and verifies that the phone number from which the order is being made matches the phone number in the customer account information. The device ID identifier 205 receives a device identifier from the UC system 101 and matches it to the device identifier in the customer database 201 to confirm that the device is registered. In some embodiments, other methods of identifying the customer may be used, for example, PIN codes. In some embodiments, two or more of these identifiers may be used together to confirm the customer's identity.

As customer information and order information is received, the payment facilitation server 200 checks the customer's account using the customer account management application 208 and either deducts and appropriate amount from the customer's prepaid account or sends the payment details to the payment processing manager 209, which forwards the payment request to a payment processor 109 for processing. Once the payment is processed, the payment facilitation server 200 sends a confirmation of the payment either to the payment facilitation device 103, the customer mobile device 102, or both.

The bill splitting application 206 receives a bill that is to be shared by two or more customers (e.g., a restaurant dining bill), the device identifier of two or more customer mobile devices 102, and provides an interface for those customers to allocate items on the bill between the customers. Once each of the customers involved approves the allocation, the bill splitting application forwards each customer's portion of the bill to the payment processing manager 209. The fund transfer application 207 operates in a similar manner for fund transfers between customers. Customers involved in the fund transfer specify amounts to be transferred to other customers, and once approved by all customers involved in the fund transfer, the fund transfer application for forwards the approved funds transfers to the payment processing manager 209 for execution.

Figure 3:
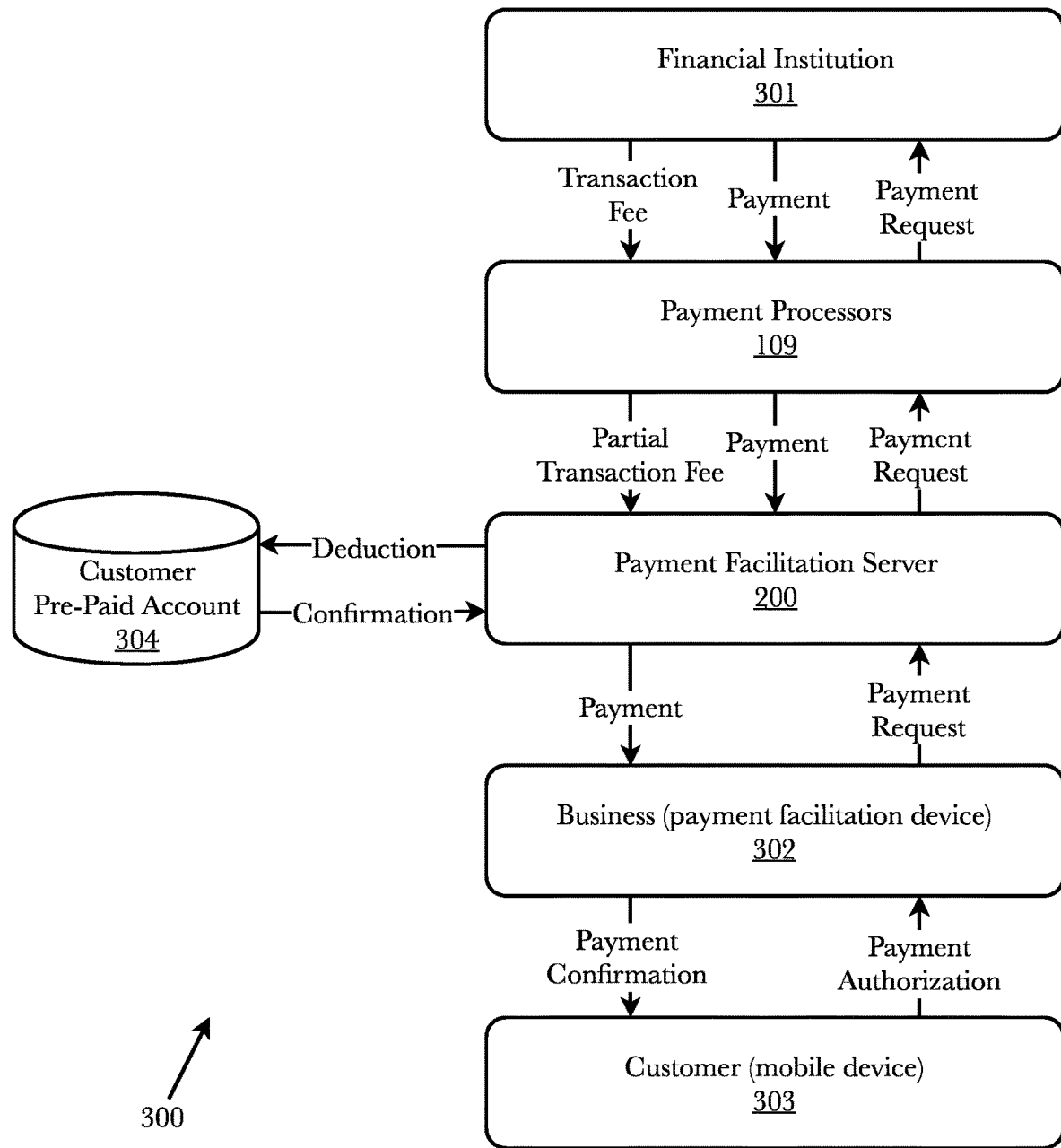
FIG. 3 is a flow diagram illustrating an exemplary flow of payments in an embodiment.

FIG. 3 is a flow diagram illustrating an exemplary flow of payments 300 in an embodiment. When a customer 303 authorizes a transaction (which authorization may be pre-approved) through his or her customer mobile device 102, the payment authorization is sent to the business 302 at the business' payment facilitation device 103. The payment facilitation device 103 of the business 302 sends a payment request to the payment facilitation server 200. The payment facilitation server 200 checks the customer's pre-paid account 304 to determine whether pre-paid funds are available. If such funds are available, a deduction is made from the customer pre-paid account 304 in the amount of the authorized payment, and a confirmation is confirmed by the payment facilitation server 200. If sufficient funds are not available in the customer pre-paid account, the account is either refilled or a direct payment request is made. In either such case, the payment facilitation server 200 sends a payment request to a payment processor 109, which are financial intermediaries like Visa and Mastercard, who process transactions on behalf of financial institutions 301 (i.e., banks). The payment processor 109 sends the payment request to a financial institution 301 at which the customer 303 has an account. The financial institution 301 receives the payment request, and sends a payment to the payment processor 109, typically along with a transaction fee. The payment processor 109 receives the payment and transaction fee, and forwards the payment to the payment facilitation server along with a portion of the transaction fee. The payment facilitation server 200 forwards the payment to the business 302, which forwards a confirmation of payment 303 to the customer, completing the transaction.

Figure 15:
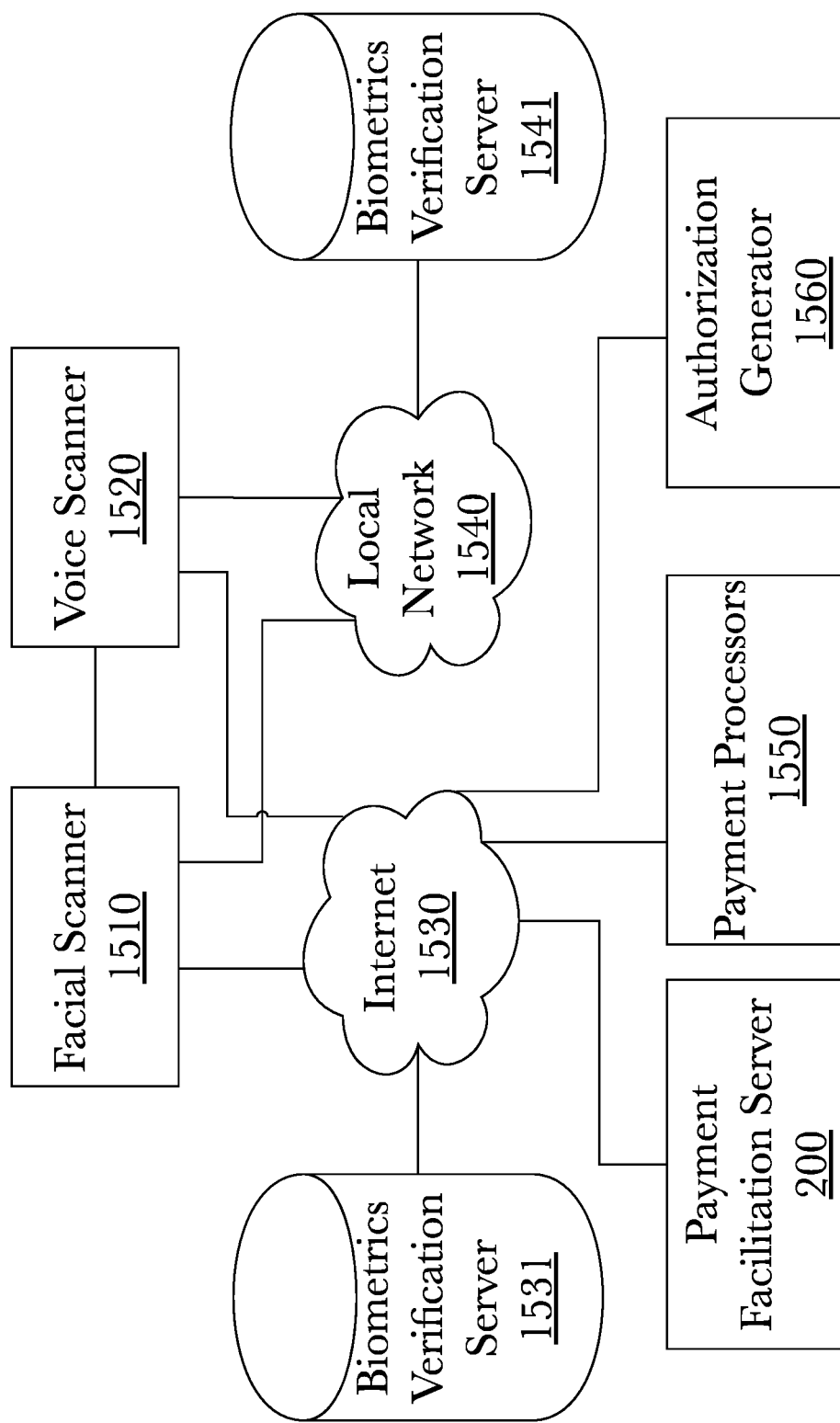
FIG. 15 is a block diagram illustrating an exemplary system architecture for a zero-step authentication system using biometric authentication.

FIG. 15 is a block diagram illustrating an exemplary system architecture for a zero-step authentication system using biometric authentication. A facial scanner 1510 such as a digital camera and Application-Specific Integrated Circuit ("ASIC"), or a digital camera connected to a personal computer, tablet, phone, or other computing device with appropriate software, may be connected to either or both of the internet 1530 or a local network 1540, sending authentication requests and video or image data, and receiving either a success or failure message, or a percentage similarity message regarding the match chance of a given customer to a stored set of data, from a biometrics verification server hosted over the internet 1531 or one hosted locally 1541. A voice scanner 1520 may operate similarly but rather than operating with a digital camera, the voice scanner 1520 operates with a microphone that may or may not be part of a digital camera (such as an embedded webcam that may be used for both the facial scanner 1510 as well as the voice scanner 1520), and may be connected to a separate ASIC or personal computer, tablet, phone, or other computing device, or may be connected to the same computing device that the facial scanner 1510 is connected to. The voice scanner 1520 may also, in a separate or in a joined network connection with the facial scanner 1510, be connected over either or both of the internet 1530 and a local network 1540 to a remote or local biometrics verification server 1531, 1541, for the purposes of sending received biometrics data including voice data to the servers, and receiving back a match to a user in the server's datastores. A singular or plurality of payment processors 1550 are accessible by either or both of the biometrics scanners 1510, 1520 and accompanying computer systems as applicable, such as VISA™, MASTERCARD™, PAYPAL™ or others, to allow the verification and execution of customer purchases with a payment facilitation server 200 as described in FIG. 2. An authorization generator 1560 retrieves customer account preferences, customer history, and restaurant sales information (e.g. restaurant average ticket amount) and determines the amount of money that should be pre-authorized for transactional purposes using subsets of the retrieved data as inputs into a machine learned predictive algorithm.

Figure 17:
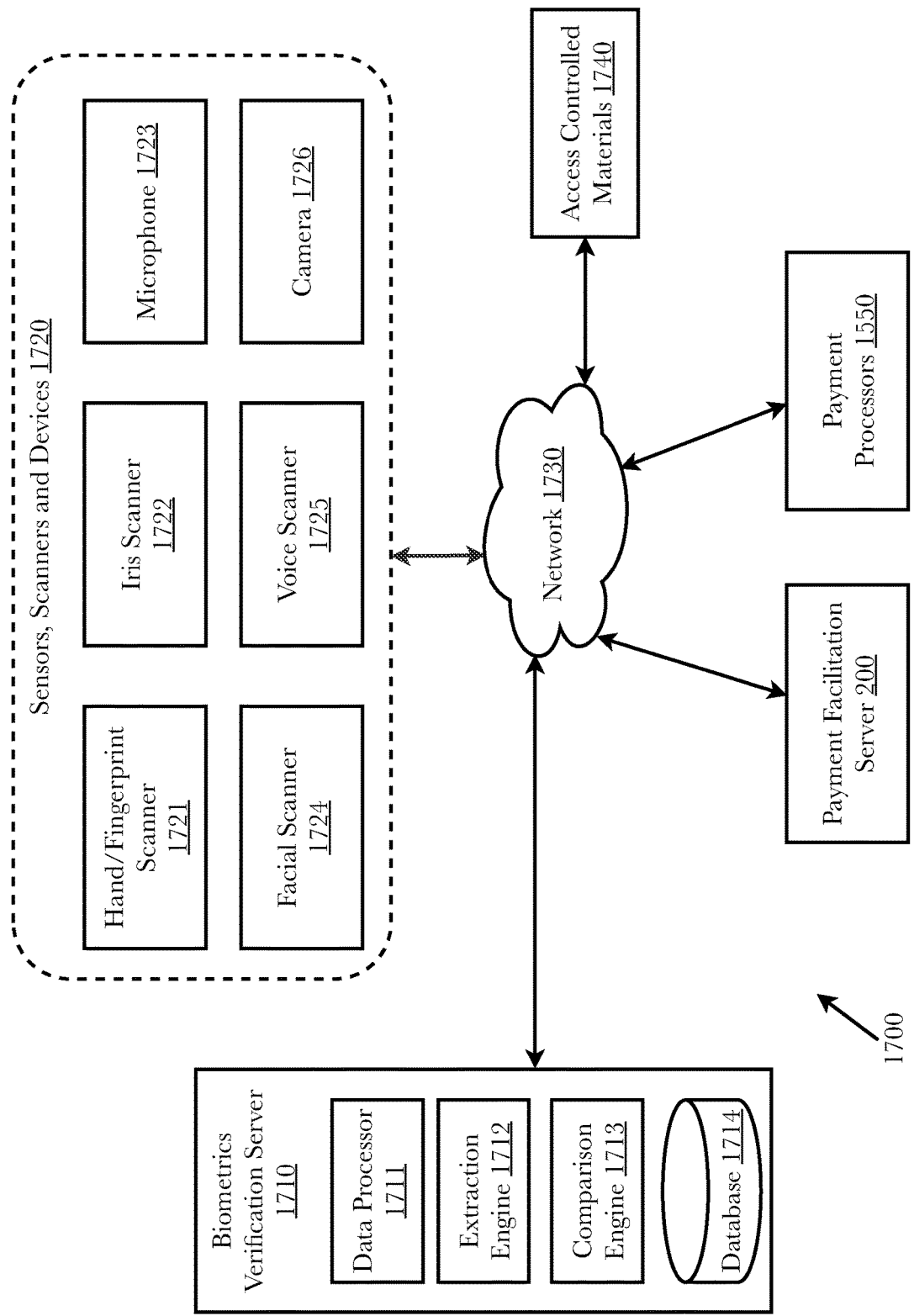
FIG. 17 is a block diagram illustrating an exemplary system architecture for zero-step user recognition and biometric access control, according to an embodiment.

FIG. 17 is a block diagram illustrating an exemplary system architecture 1700 for zero-step user recognition and biometric access control, according to an embodiment. According to the embodiment, the zero-step user recognition and biometric access control system 1700 may comprise various sensors, scanners, and devices 1720 configured to capture a plurality of biometric data associated with a system user and to forward the captured biometric data to a biometrics verification server 1710 via a network 1730. In some embodiments, the various sensors, scanners, and devices 1720 may be located at the same location as the biometric verification server 1710 and communication between and among these components may be facilitated by network 1730 acting as a local network (e.g., local area network, wireless LAN, etc.). In other embodiments, the various sensors, scanners, and devices 1720 and the biometric verification server 1710 may be located at two separate locations geographically separated by a physical distance and communication between and among these components may be facilitated by network 1730 such as, for example, the Internet, Wi-Fi, BLUETOOTH™, mobile phone networks, and the like. In some embodiments, biometric verification server 1710 may be a distributed system comprising one or more computing devices such as in a cloud infrastructure.

According to some embodiments, the sensors, scanners, and devices 1720 can include, but are not limited to, a fingerprint scanner 1721, an iris scanner 1722, a facial scanner 1724, a voice scanner 1725, one or more cameras 1726, and one or more microphones 1723. According to some embodiments, these type of devices may be arranged either singly or in some combination, and deployed at a location where zero-step user recognition and access control may be necessitated or desired. Devices 1720 may be configured to capture a plurality of data to extract biometric characteristic information in order to construct a biometric template of a user, or to be used to compare against existing biometric templates to perform user recognition and authentication functions. In some embodiments, biometric characteristic information may comprise physiological measurements and behavioral measurements. Physiological measurements can be either morphological (e.g., fingerprints, hand shape, the finger, vein pattern, the eye/iris/retina, face shape, etc.) or biological (e.g., DNA, blood, saliva, urine, etc.). Behavioral measurements can include, but are not limited to, voice recognition, signature dynamics (e.g., speed of movement of pen, accelerations, pressure exerted, inclination, etc.), keystroke dynamics, the way a user uses objects (e.g., how a mobile phone is held, etc.), gait or the sound of steps, gestures, and the like. In various embodiments, biometric information may be captured, gathered, aggregated, derived, or otherwise obtained from various system components and devices 1720.

In some embodiments microphone 1723 may comprise one or more microphones configured to capture a broad range of frequencies and any suitable microphone known to those skilled in the arts may be implemented in different embodiments. In some embodiments microphone 1723 may be an embedded piece of hardware existing within a computing device such as, for example, a computer (e.g., personal or laptop), a smart phone, tablet, or other mobile computing device, a point-of-sale (POS) system at a business establishment such as a restaurant, and the like. In some embodiments microphone 1723 may be an individual component that need not be embedded into a computing device and may be free standing. In such embodiments, freestanding microphone 1723 may capture audio data and transfer the captured data to a computing device via either a wired connection (e.g., HDMI, USB, audio cables, etc.) or wireless connection (e.g., WiFi, BLUETOOTH™, etc.). In other embodiments, a combination of embedded and freestanding microphones may be used together to capture audio data. In some embodiments captured audio data may be analyzed to determine voice and speech rhythms which can be used to create a voiceprint profile of a user. A voiceprint profile may comprise biometric data associated with a given user's voice and may be a component of the user's biometric template. Using a voiceprint profile, a user's voice can be used to uniquely identify biological characteristics to recognize and authenticate an individual. Voice biometric data may comprise vocal characteristics such as frequency, duration, amplitude, and other extracted phonetic features.

According to some embodiments, camera 1723 may be configured to capture either image data, video data, or some combination of the two. In some embodiments, one or more cameras 1723 may be arranged in various positions in order capture a plurality of angles (e.g., above, front, side, face, behind, etc.) of a user in order to capture various biometric information (e.g., facial data, gait/stance/gesture data, etc.). In some embodiments, camera 1723 may be configured to take a photograph and/or video of a user and transmit the photograph and/or video of the user to biometric verification server 1710 where data processor 1711 may process the photograph and/or video for further processing and/or storage.

According to some embodiments, data processor 1711 may be configured to receive a plurality of data from devices 1720 and to process the received plurality of data into the correct format for further processing by system 1700 components. For example, data processor 1711 may receive audio data from microphone 1723 and perform discretization on the audio data so that the signal contained in the audio data may be digitally processed by system 1700.

According to some embodiments, extraction engine 1712 may be configured to receive, retrieve, or otherwise obtain a plurality of processed data and perform the appropriate action on the received plurality of processed data in order to extract biometric features and characteristics which can be used to create a biometric template of a user, or to extract the biometric features and characteristics in order to compare against existing biometric templates to support user recognition and access controls functions. For example, extraction engine 1712 may receive audio data that has been processed to suppress the background noise and isolate the voice, and then perform feature extraction on the audio data to register a new voiceprint, or to verify a user. In some embodiments, a machine learning algorithm may be configured to receive as input a plurality of voice data from a plurality of users in order to generate a model that can be used to extract the features of a given voice sample. Such a model can be used to recognize a user using the extracted features to create a new voiceprint or compare against existing voiceprints. In some embodiments, the machine learning algorithm is a deep neural network (DNN) which is trained to create a composite model using a plurality of processed audio data as training data. To create/verify an individual user's voiceprint, a user can provide one or more speech samples (e.g., audio data captured by microphone 1723) to the composite model, which is fine tuned (e.g., hyperparameter tuning, weights/coefficients adjusting, etc.) to learn the user's unique speech characteristics. This DNN modeling process occurs directly against speech samples as new audio data is received. In some embodiments, to identify a user a speech sample is evaluated against the fine-tuned DNN model and a score is calculated, which can be used to indicate the user as identified or not depending on the desired confidence for a particular use case.

According to some embodiments, extraction engine 1712 may be configured receive, retrieve, or otherwise obtain a plurality of processed data and perform the appropriate action on the received plurality of processed data in order to extract biometric features and characteristics which can be used to create a biometric template of a user, or to extract the biometric features and characteristics in order to compare against existing biometric templates to support user recognition and access controls functions. According to some embodiments, extraction engine 1712 may comprise one or more machine learning algorithms configured to extract the unique features in an individual's face (e.g., how big eyes are, how long a face is, eye spacing, ear shape, mouth shape, distance between a user's eyes, the depth of a user's eye sockets, the distance from a user's forehead to chin, the shape of a user's cheekbones, and the contours of a user's lips, ears, and chin, etc.) based on one or more input images. One machine learning algorithm may be implemented which is specifically configured to detect faces in received image data (i.e., photographs/video). Such an algorithm should be able to iterate through each pixel in the image and assign a gradient indicating the flow from light to dark across an entire image. By considering the direction that brightness changes, both dark images and bright images can yield the same exact representation. This gradient assignment process may be conducted on individual pixels or groups of pixels and the resulting gradient image can be used to detect faces in an image by finding a part of the gradient image that looks most similar to a known gradient pattern that was extracted from a plurality of training faces.

According to some embodiments, comparison engine 1713 may be configured to receive, retrieve, or otherwise obtain a plurality of data, compare the received plurality of data against a plurality of stored data, and generate an indication of a match between the received data and stored data based upon the comparison. The received plurality of data may comprise processed biometric data from data processor and/or database 1714 and extracted biometric characteristics from extraction engine to perform comparison functions. Users in a photo may be identified based on collected biometrics and stored photograph/biometric profiles. For example, comparison engine 1713 may receive a photograph, taken in real-time, from camera 1723 as well other biometric data such as speech and gait characteristics as determined by extraction engine 1712 and compare the received photograph against stored photographs and the biometric characteristics against stored biometrics in order to perform user recognition and access control functions. In this example, the system 1700 performs the comparison and finds that the biometric data matches User A, and that the face in the corner of the photograph has a high confidence of matching a stored photograph of User A, therefore User A is recognized as the person in the photograph based on physiological biometric data contained within the biometric template. After identifying a physiological match, the system can perform a comparison between the stored biometric templates and any behavioral biometric data (e.g., audio data of a user speaking, etc.). If both a behavioral and physiological match can be found using stored biometrics and extracted features of biometric data, then the biometrics verification server 1710 can respond with a positive match indicating user identity confirmation. This process may be carried out as a zero-step user recognition process using passive biometrics that does not require any actions to be performed by a user.

According to some aspects of some embodiments, the system 1700 may further comprise a payment facilitation server 200 and payment processors 1550. A payment facilitation server 200 may be configured to receive a confirmation of a customer's identity, connect with a customer's mobile device and obtain a device identifier, and transmit transaction details to the confirm customer's mobile device, as well as send the device identifier to payment processor 1550 which can interact with a confirmed customer's stored account information to conduct a transaction.

According to some aspect of some embodiments, the system 1700 may further comprise access controlled materials 1740 that may be located at the same location as the sensors, scanners, and devices 1720 and may comprise a computing device (not shown) configured to receive biometric data from the sensors and devices 1720 and to transmit the biometric data to biometric verification server 1710 which can perform zero-step user recognition with the received biometric data to confirm a user's identity. The confirmation of a user identity may be transmitted back to the computing device wherein the computing device may allow access to the controlled materials 1740. In some embodiments, the access controlled materials may comprise any one of, or some combination of, hardware, software, and physical locations.

Detailed Description of Exemplary Aspects

Figure 4:
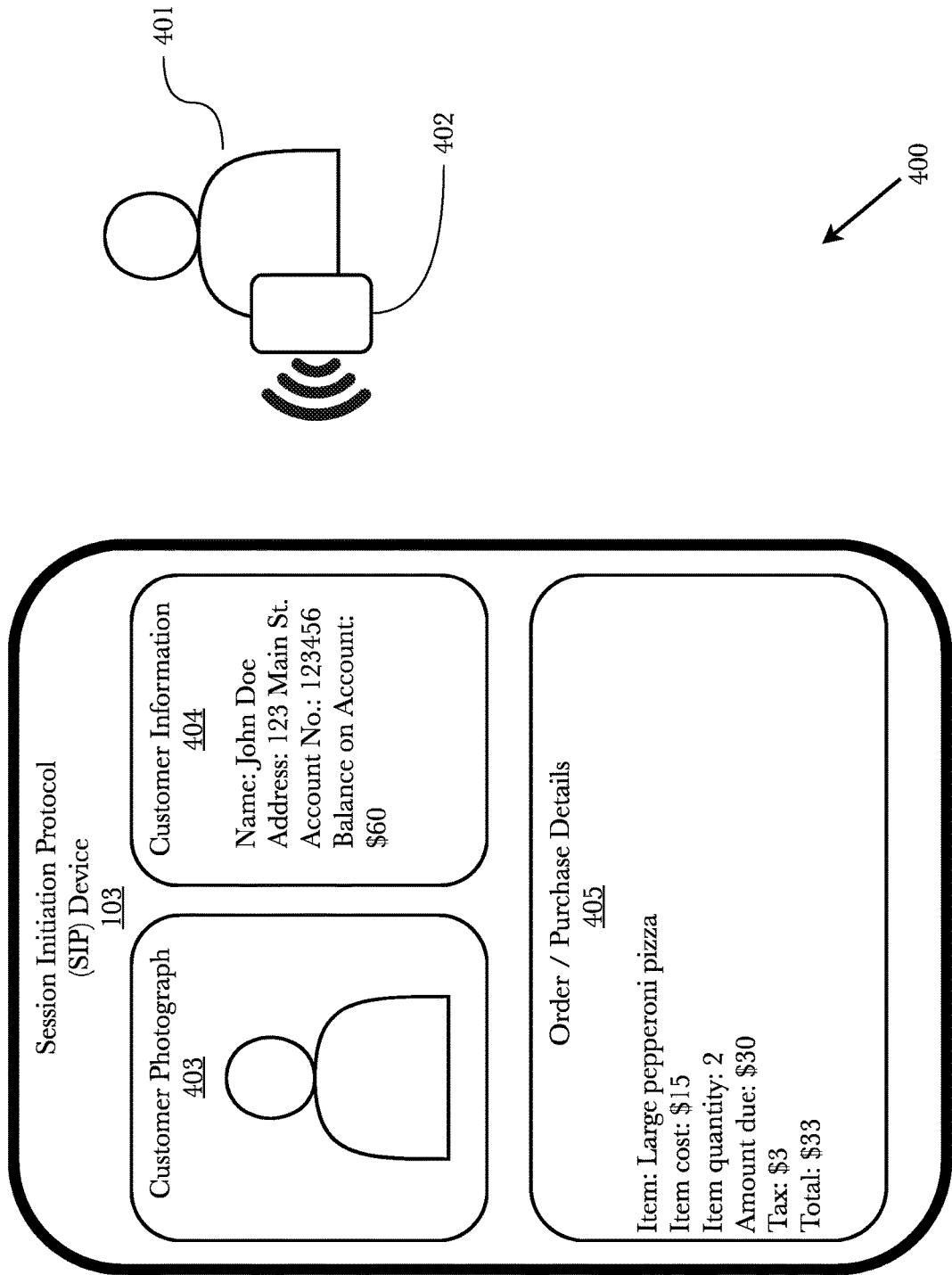
FIG. 4 is a diagram illustrating an exemplary business/customer interaction and showing an exemplary screenshot.

FIG. 4 is a diagram illustrating an exemplary business/customer interaction 400 and showing an exemplary screenshot. In this example, a customer 401 (who already has an account and registered device 402 at a business establishment) makes an order. The customer's device 402 and the payment facilitation device 103 detect each other and establish a connection when the customer 401 enters the business establishment. The customer's photograph 403 is displayed on the business' payment facilitation device 103, along with the customer's information 404 and order details 405. An employee of the business clicks on the customer photograph 403 to confirm the identity of the customer 401. Once confirmed, the customer device 402 automatically approves payment and receives confirmation of the payment without the customer having the handle the device 402. The customer device 402 may remain in the customer's pocket, purse, backpack, etc., and does not have to be removed to complete the transaction.

Figure 5:
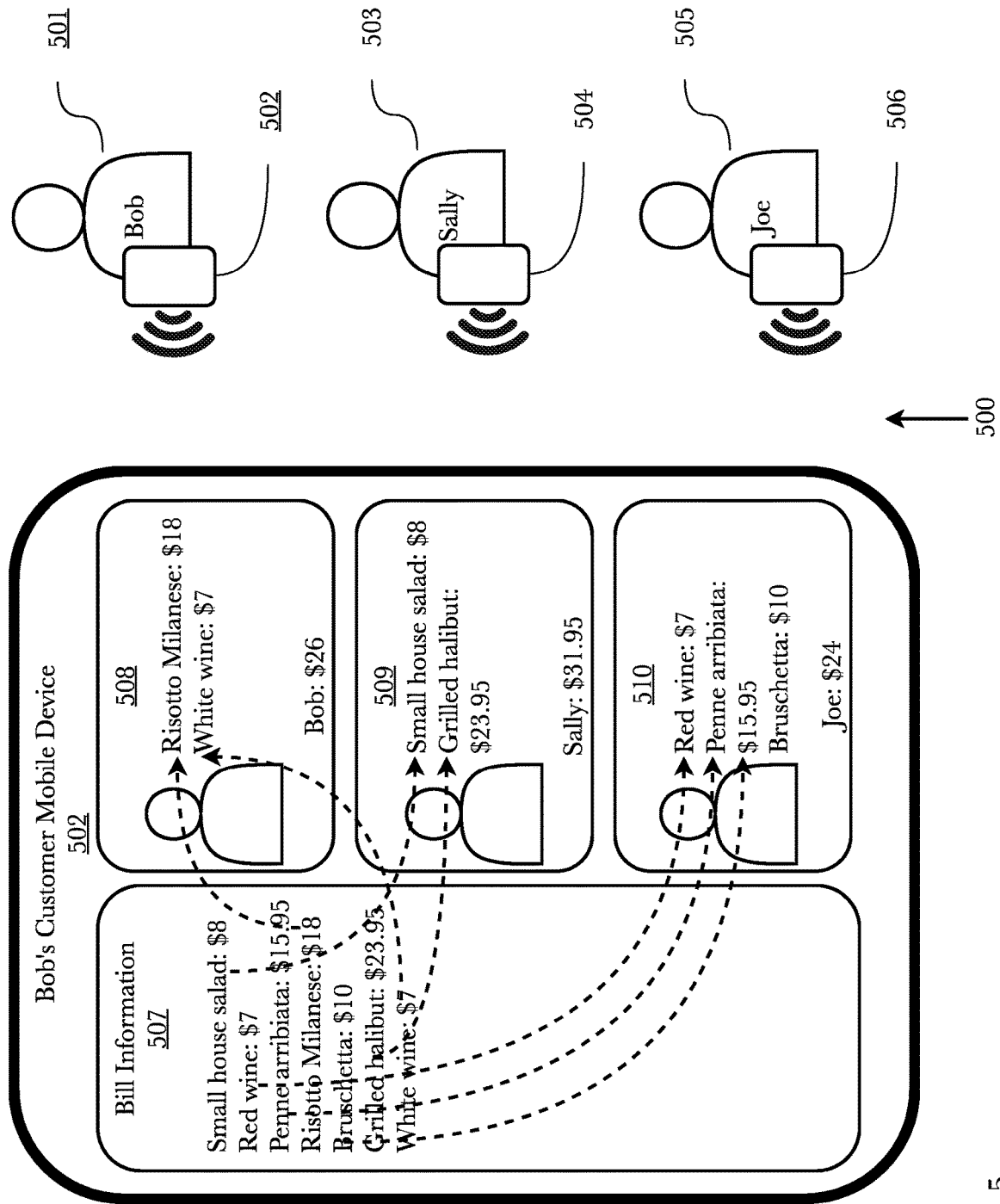
FIG. 5 is a diagram illustrating an exemplary bill splitting feature and showing an exemplary screenshot.

FIG. 5 is a diagram illustrating an exemplary bill splitting feature 500 and showing an exemplary screenshot. In this example, three customers, Bob 501, Sally 503, and Joe 505, each with their respective mobile devices 502, 504, and 506, have a meal together at a restaurant and want to split the bill among themselves. Each customer's mobile device has a bill splitting application installed on it, which shows a copy of the bill and the customers who dined together. For example, Bob's 501 mobile device 502 shows the bill information 507 for the group on the left-hand side of his screen, and a window for himself 508, a window for Sally 509, and window for Joe 510 on the right side. The mobile devices 504, 506 of Sally 503 and Joe 505 show similar screens. The windows 508, 509, 510, each show a photo (or other representation) of the customer, a space for allocating items from the bill, and a total of the items allocated to that customer. As each customer, on his or her respective mobile device 502, 504, 506, allocates food and drink items from the bill information 507 by clicking on them and dragging them to the window of a person on the right, the allocation of those food and drink items appears in the window of the person to whom the item has been allocated, as indicated by the arrows. For example, the risotto Milanese and white wine have been allocated to Bob (either by Bob or by one of the other two customers), a total due from Bob of $26 is shown, and this information is updated on all three mobile devices 502, 504, 506. Once all three customers 501, 503, 505 approve the allocation, each person's mobile device 502, 504, 506 processes the payment for the amount allocated to that customer. In some embodiments, unallocated items may be automatically split among the customers in the group.

Figure 6:
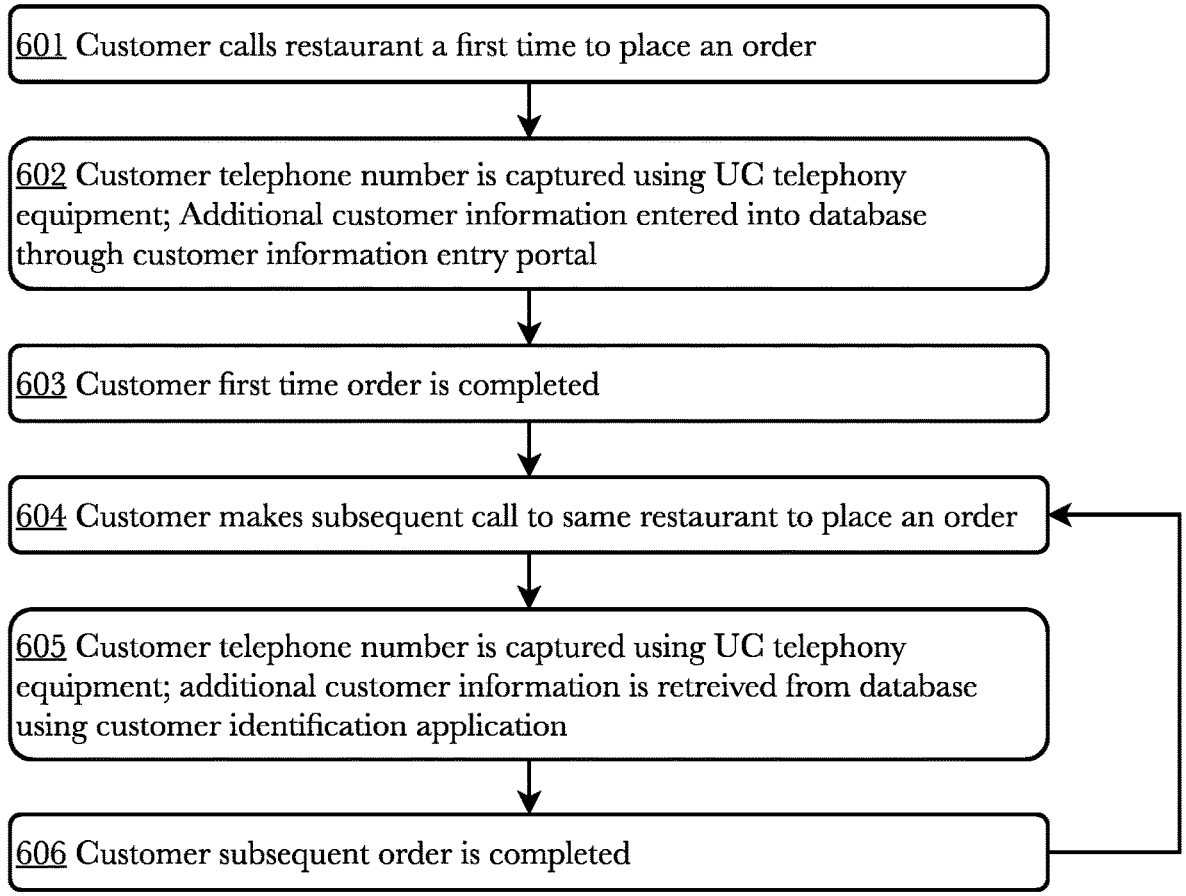
FIG. 6 is a flow diagram showing the steps of an exemplary method for registration of a customer's mobile device and order placement.

FIG. 6 is a flow diagram showing the steps of an exemplary method for registration of a customer's mobile device and order placement. When a customer calls restaurant a first time to place an order 601, the customer's telephone number is captured using UC telephony equipment, and additional customer information is gathered and entered into database by an employee of the business 602. The customer than makes his or her order and the order is completed 603. Each time the customer makes a subsequent call to same business to place an order 604, the customer's telephone number is captured using UC telephone equipment, and the customer's information is retrieved from a customer database using a customer identification application 605. The customer than makes his or her order and the order is completed 606 without the customer having to provide his or her information. The same procedure is used when a customer physically enters a business establishment, except that the registration is performed in person.

Figure 7:
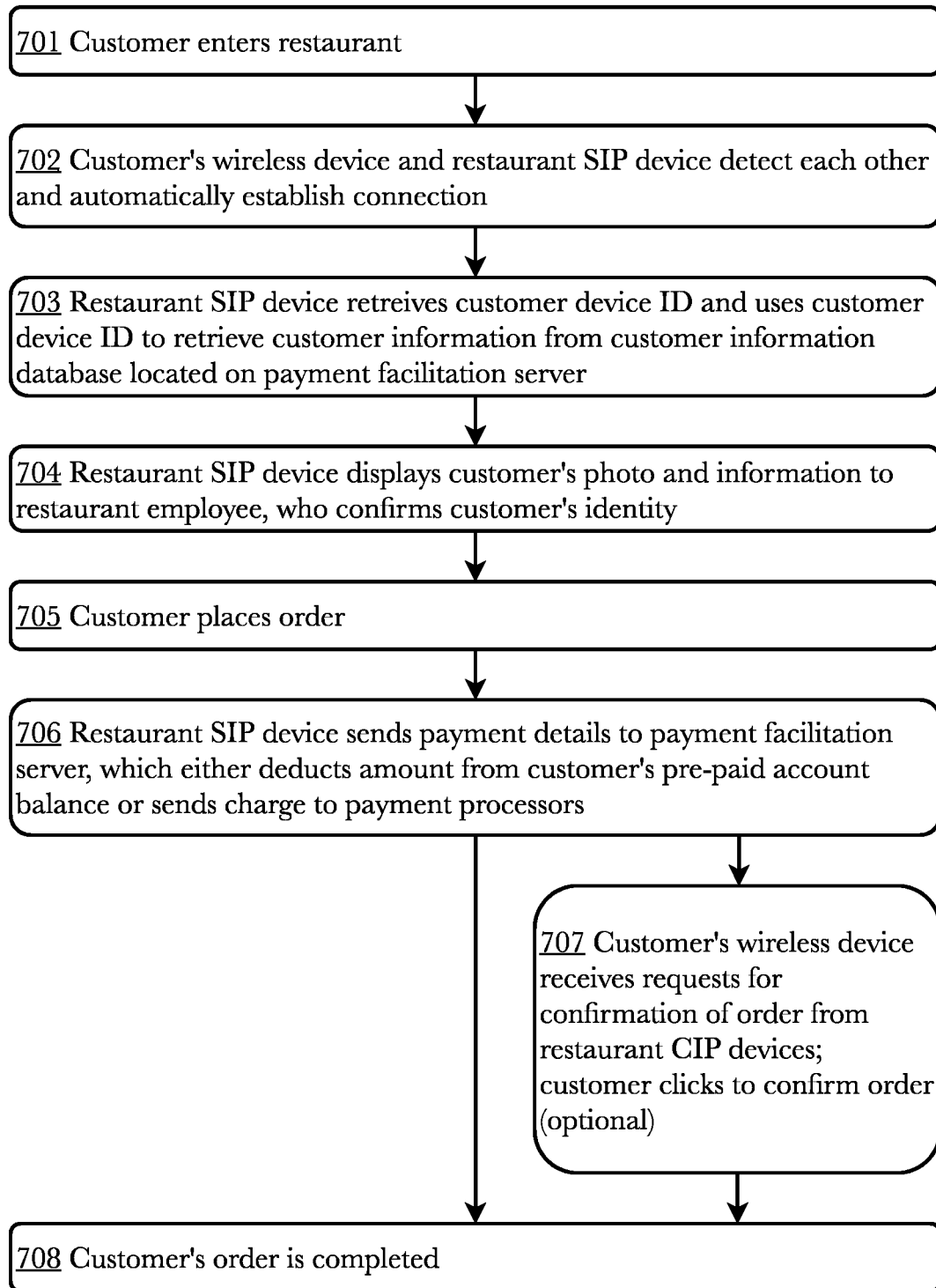
FIG. 7 is a flow diagram showing the steps of an exemplary method for zero-step authentication and completion of a transaction.

FIG. 7 is a flow diagram showing the steps of an exemplary method for zero-step authentication and completion of a transaction. When a customer enters a business establishment 701, the customer's wireless device and business payment facilitation device detect each other and automatically establish connection 702. The business payment facilitation device retrieves the customer device identifier (ID) and uses the customer device ID to retrieve customer information from customer information database located on a payment facilitation server 703. The business payment facilitation device displays customer's photo and information to a restaurant employee, who confirms customer's identity by clicking on the photo of the customer 704. The customer the places an order 705. When the order is placed, the business payment facilitation device sends payment details to payment facilitation server, which either deducts amount from customer's pre-paid account balance or sends charge to payment processors 706. Optionally, an additional security step may be inserted wherein the customer's wireless device receives and displays a request for confirmation of the order from the business CIP device and the customer clicks on the displayed request to confirm the order 707. Finally, the customer's order is completed 708.

Figure 8:
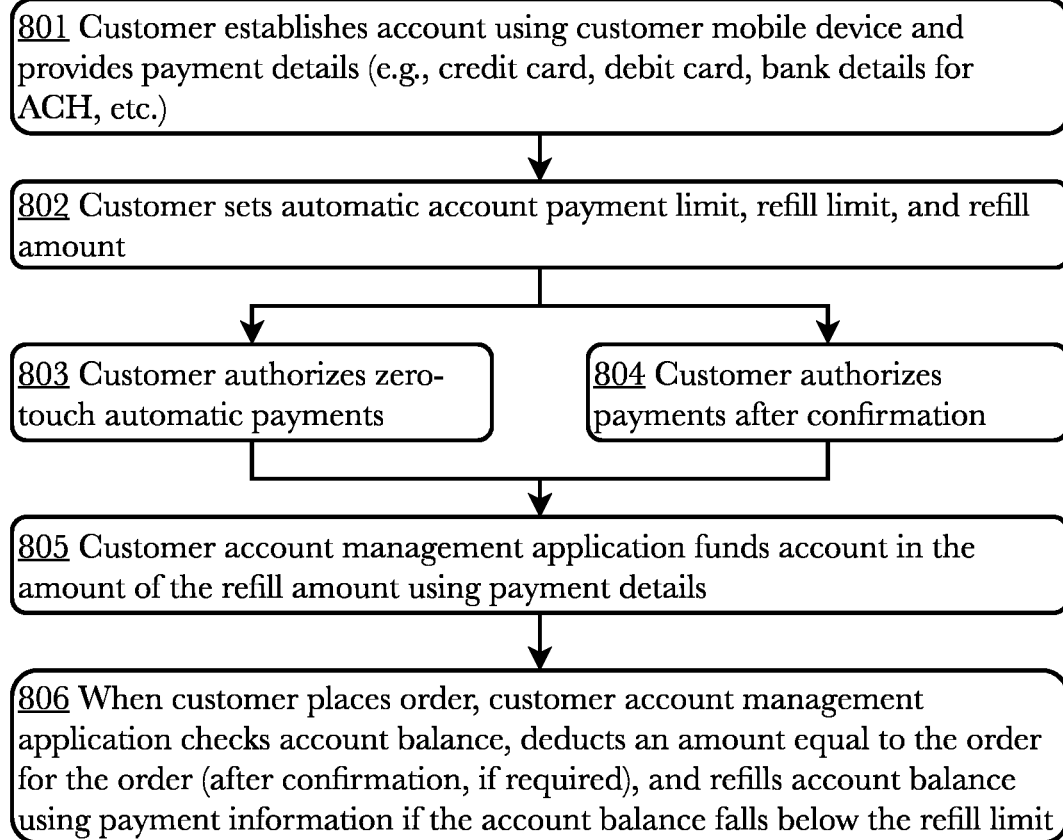
FIG. 8 is a flow diagram showing the steps of an exemplary method for establishment of an account and pre-authorization of payments.

FIG. 8 is a flow diagram showing the steps of an exemplary method for establishment of an account and pre-authorization of payments. First, a customer establishes and account using his or her customer mobile device and provides payment details (e.g., credit card, debit card, bank details for ACH, etc.) 801. The customer then sets automatic an account payment limit, a refill limit, and a refill amount 802. For example, the customer may set a payment limit for each transaction at $50, a refill limit (i.e., minimum account balance below which the account will be automatically refilled) of $10, and a refill amount of $100. The customer may choose to have such payments sent automatically without handling his or her mobile device (zero-step authentication) 803 or may choose to authorize each payment individually using his or her mobile device 804. A customer account management application funds the account in the amount of the refill amount using payment details 805. Thus, in this example, the customer has pre-authorized payments of up to $50 per transaction, and pre-authorized the system to automatically refill his account from the customer's financial institution (or credit card) in the amount of $100 whenever the account balance falls below $10. When the customer places an order, the customer account management application checks account balance, deducts an amount equal to the order for the order (after confirmation, if required), and refills account balance using payment information if the account balance falls below the refill limit 806.

FIG. 9 is a flow diagram showing the steps of an exemplary method for bill splitting among customers. Each customer mobile device runs an application that shows nearby customer devices also using the payment system 901. Customers dining together form a group by selecting one another (or accepting a group formation created by one or more of them) 902. Each customer's device displays a copy of the itemized bill on one side of the screen, and a photo (or other representational image) of each other customer in the group on the other side of the screen 903. One or more of the customers in the group assigns payment by clicking and dragging items from the itemized bill to the photo (or image) of the customer responsible for paying for that item 904. When the group is finished assigning payments, each customer approves his/her proposed payment assignments, with unassigned items being distributed equally among the customers in the group 905. After all customers in the group have approved their payment assignments, the payment system processes payments from each customer's account according to the approved payment assignments 906.

Figure 10:
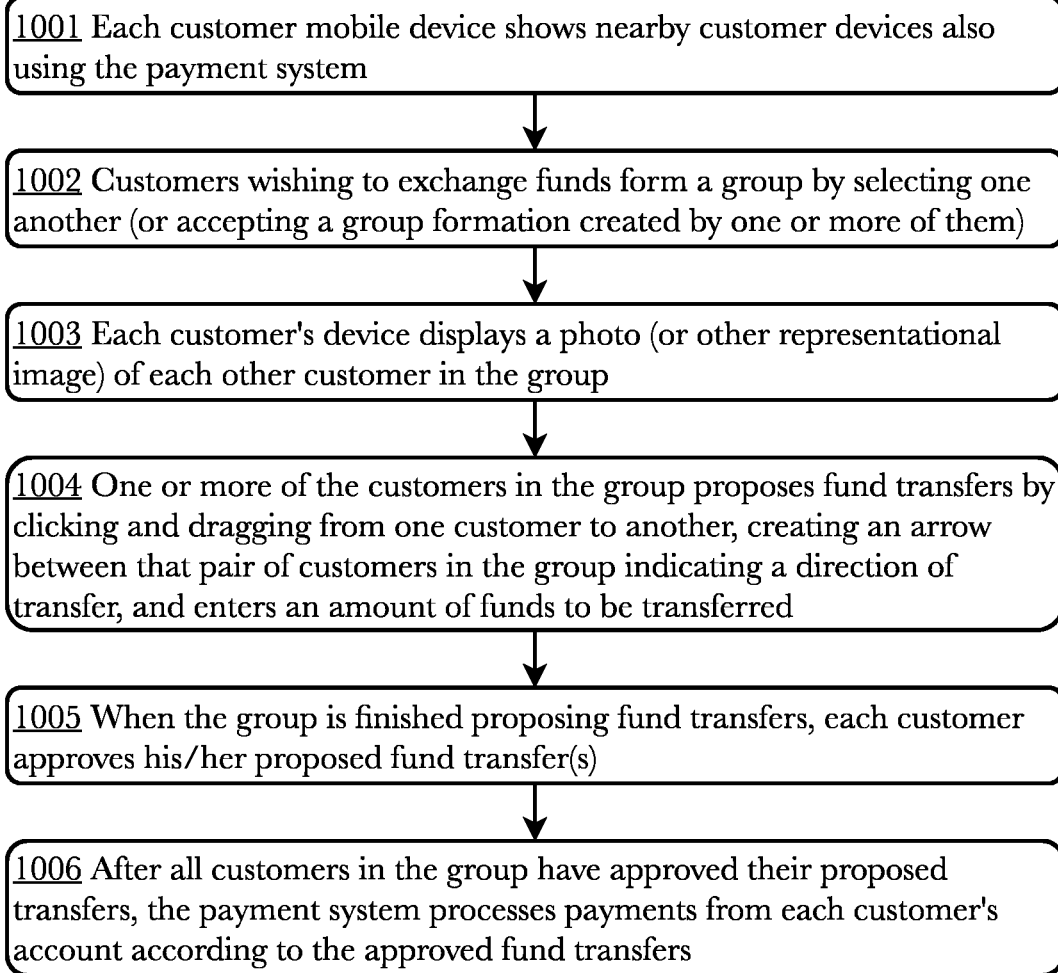
FIG. 10 is a flow diagram showing the steps of an exemplary method for funds transfer among customers.

FIG. 10 is a flow diagram showing the steps of an exemplary method for funds transfer among customers. Each customer mobile device runs an application that shows nearby customer devices also using the payment system 1001. Customers wishing to exchange funds form a group by selecting one another (or accepting a group formation created by one or more of them) 1002. Each customer's device displays a photo (or other representational image) of each other customer in the group 1003. One or more of the customers in the group proposes a fund transfer by clicking and dragging from one customer to another, creating an arrow between that pair of customers in the group indicating a direction of transfer, and enters an amount of funds to be transferred 1004. When the group is finished proposing fund transfers, each customer approves his/her proposed fund transfer(s) 1005. After all customers in the group have approved their proposed transfers, the payment system processes payments from each customer's account according to the approved fund transfers 1006.

Figure 16:
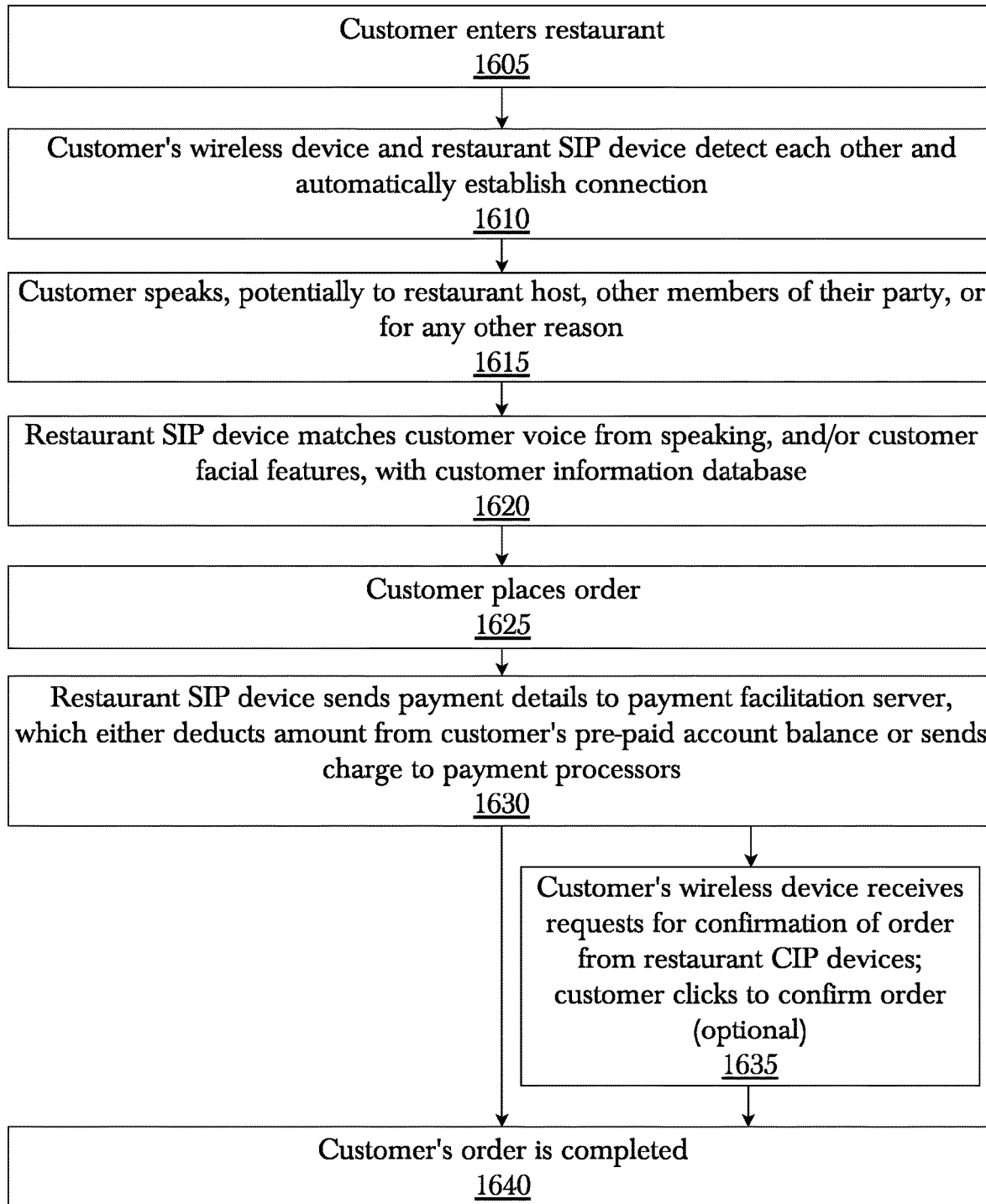
FIG. 16 is a flow diagram showing the steps of an exemplary method for zero-step authentication using biometrics and completion of a transaction.

FIG. 16 is a flow diagram showing the steps of an exemplary method for zero-step authentication using biometrics and completion of a transaction. When a customer enters a business establishment 1605, the customer's wireless device and business payment facilitation device detect each other and automatically establish connection 1610. The business payment facilitation device retrieves the customer device identifier (ID) and uses the customer device ID to retrieve customer information from customer information database located on a payment facilitation server 1615. The customer may speak verbally upon entering the restaurant or otherwise coming within sufficient range of a voice detection system, whether it is passive and unintrusive or the customer is encouraged such as from a sign in the doorway saying, "please speak," either to themselves, to the host or hostess, to another member of their party, or to someone or something else 1615. This speech, or the customer's face as scanned passively without the user initiating any step of authentication themselves from a facial scanner, or some combination of the two, may then be utilized to match the customer's biometrics to data stored in a customer information database 1620 either locally or over the Internet. The customer the places an order 1625. When the order is placed, the business payment facilitation devices ends payment details to payment facilitation server, which either deducts amount from customer's pre-paid account balance or sends charge to payment processors 1630. Optionally, an additional security step may be inserted wherein the customer's wireless device receives and displays a request for confirmation of the order from the business CIP device and the customer clicks on the displayed request to confirm the order 1635. Finally, the customer's order is completed 1640.

Figure 18:
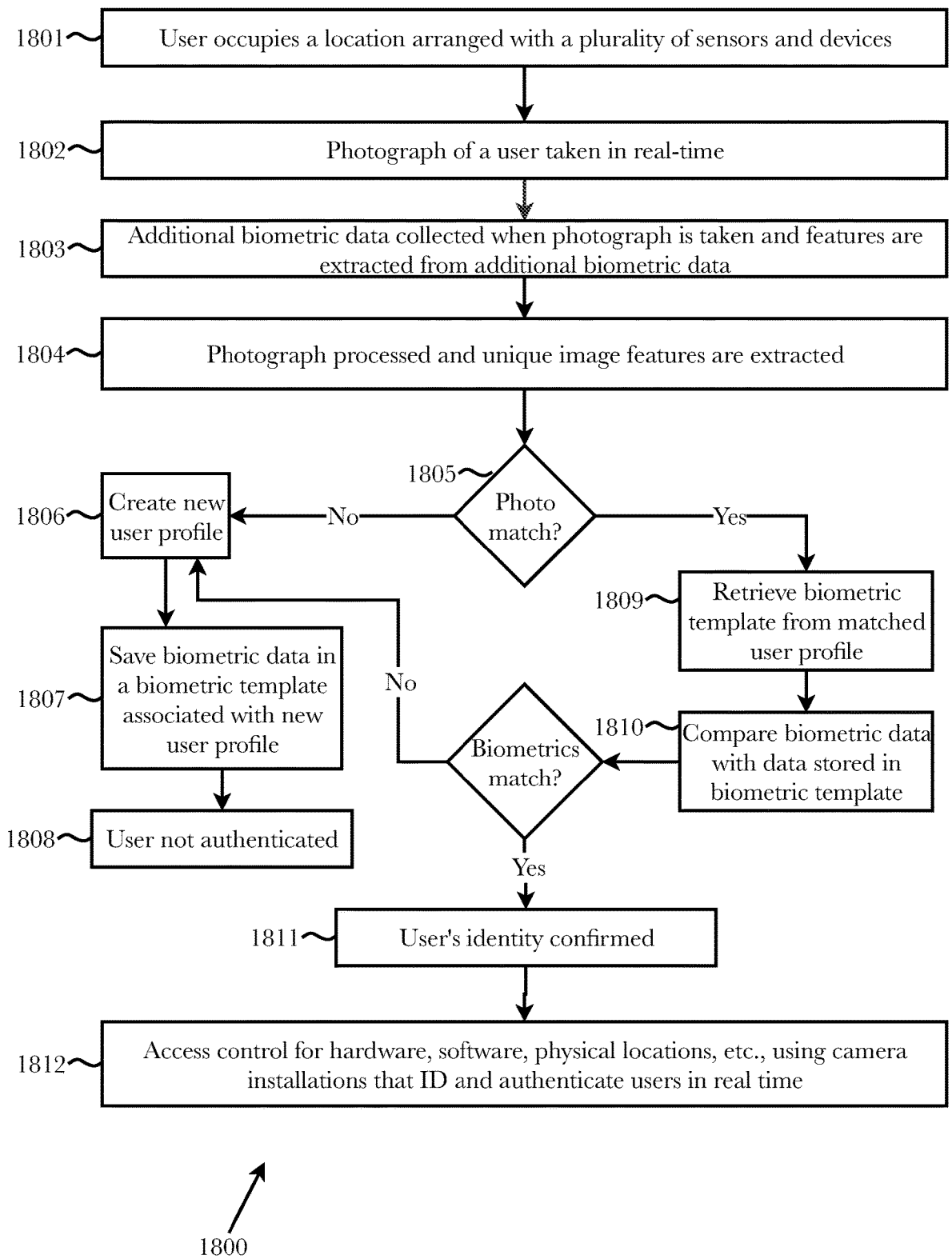
FIG. 18 is a flow diagram of an exemplary method for zero-step user recognition and biometric access control, according to an embodiment.

FIG. 18 is a flow diagram of an exemplary method 1800 for zero-step user recognition and biometric access control, according to an embodiment. According to the embodiment, the process begins at step 1801 when a user enters a location where a plurality of sensors and devices may be arranged in order to collect user biometric data. The location may be any number of suitable locations such as, for example, a restaurant or other business enterprise, a workstation in an office with a particular software installed on the workstation, a remote location, a hardware repository or particular hardware device, or some other physical location. At step 1802, a photograph is taken of the user by one of the sensors or devices such as a camera or video camera, an image sensor, or some other device known to those skilled in the arts. Additionally, the sensors and devices may also be configured to capture other biometric data of the user while the photograph is taken at step 1803. The image data associated with the photograph is processed and unique image features are extracted as a first set of biometric characteristic data at step 1804. At step 1805, the photograph and/or its extracted features may be compared against stored photographs in database 1714 in order to find a match. If no match is found, then the process proceeds to step 1806 and a new user profile is created and the photograph, its extracted features, and any additionally captured biometric data is saved as a biometric template associated with the new user at step 1807. Then biometric verification server 1710 may produce an indication that the user does not match any stored user profiles and is thus not authenticated at step 1808.

However, if at step 1805 the photograph and/or the extracted features match a photograph stored in database 1714 then the process proceeds to step 1809 and a biometric template associated with the matched user profile is retrieved by biometric verification server 1710. At this point the system may indicate that the user is a physiological match to an existing user profile. Then at step 1810, verification server 1710 compares the retrieved biometric template and the biometric characteristic data sets contained therein against the additional biometric data and/or extracted features to determine if a behavioral match is found. If the biometrics do not match then the process proceeds to step 1806 and results in an indication that the user is not authenticated. If the biometrics do match, then the users identity is confirmed 1811 and the confirmation of identity using biometrics may be used to facilitate access control for various materials, locations, and resources at step 1812.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
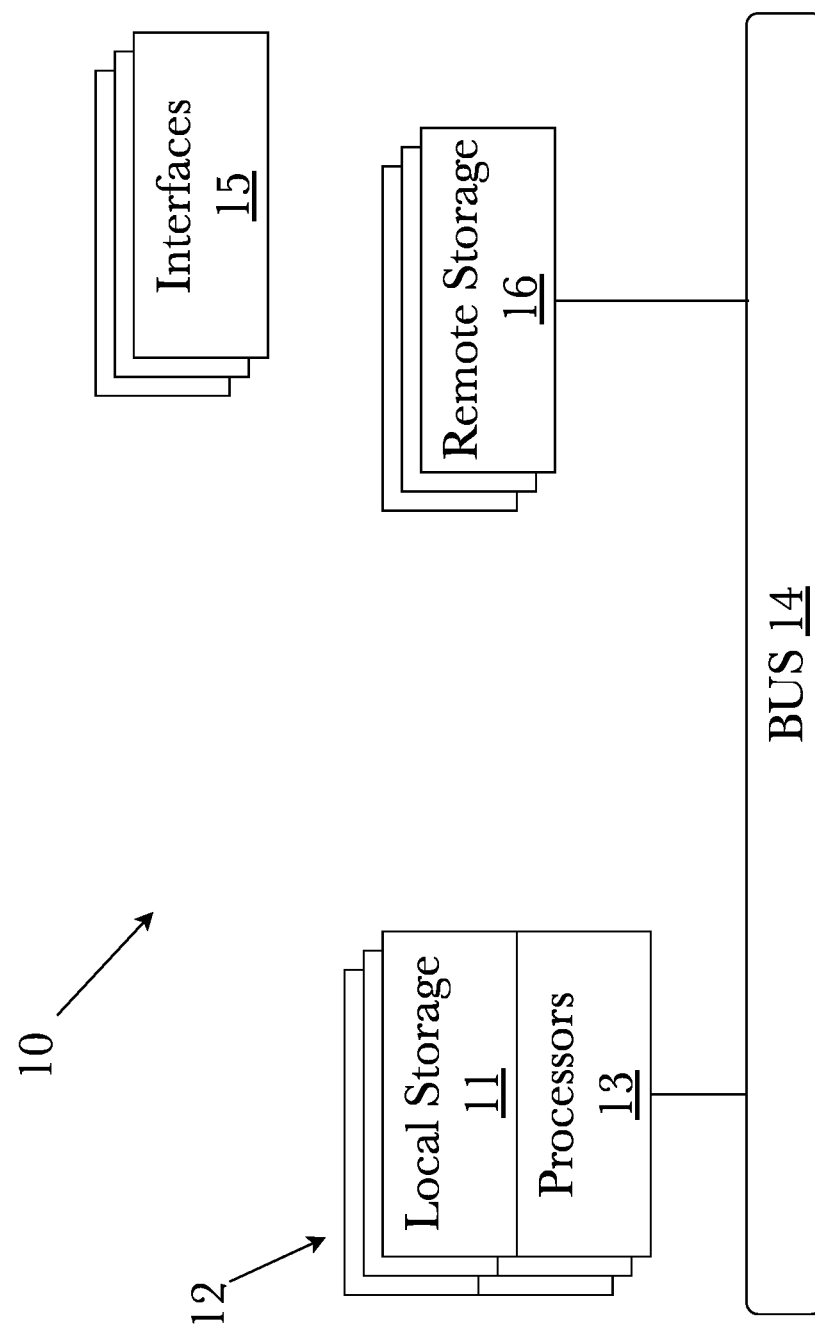
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more buses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WIFI), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
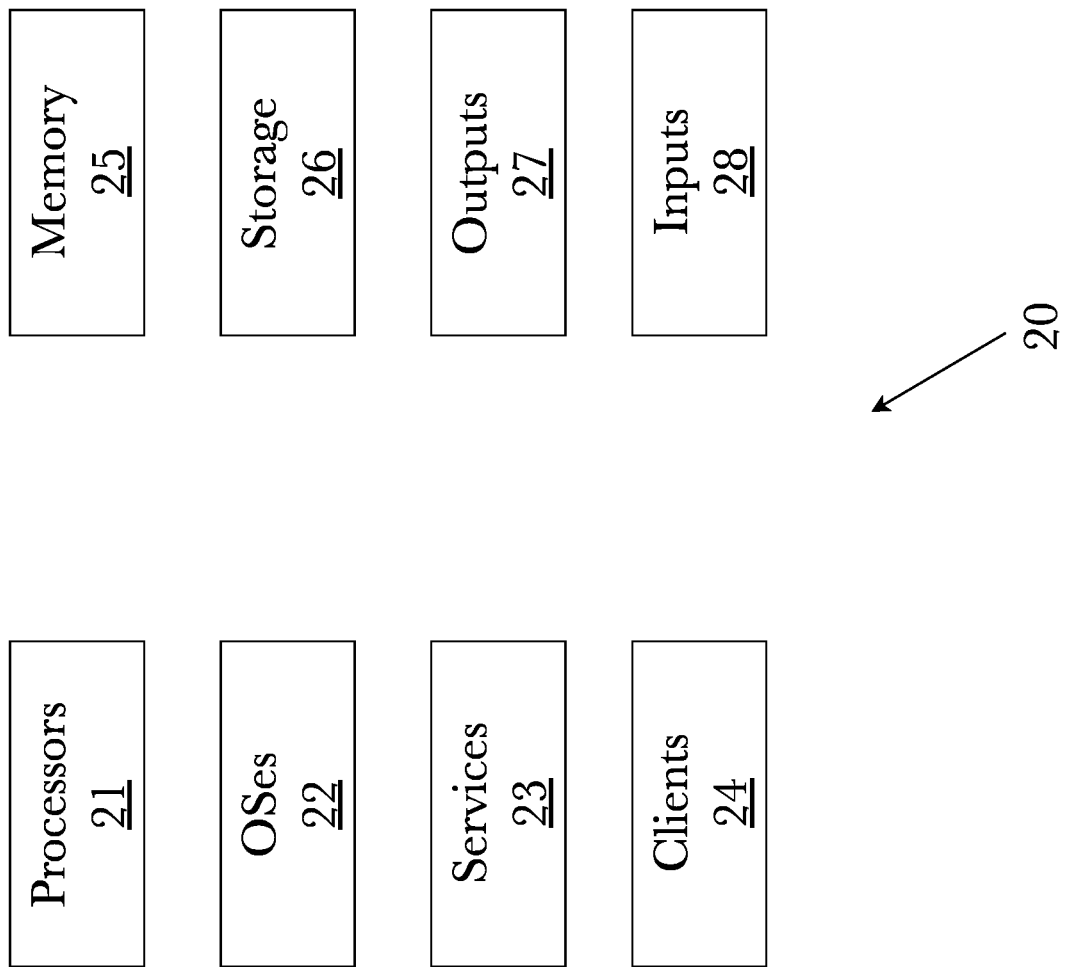
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
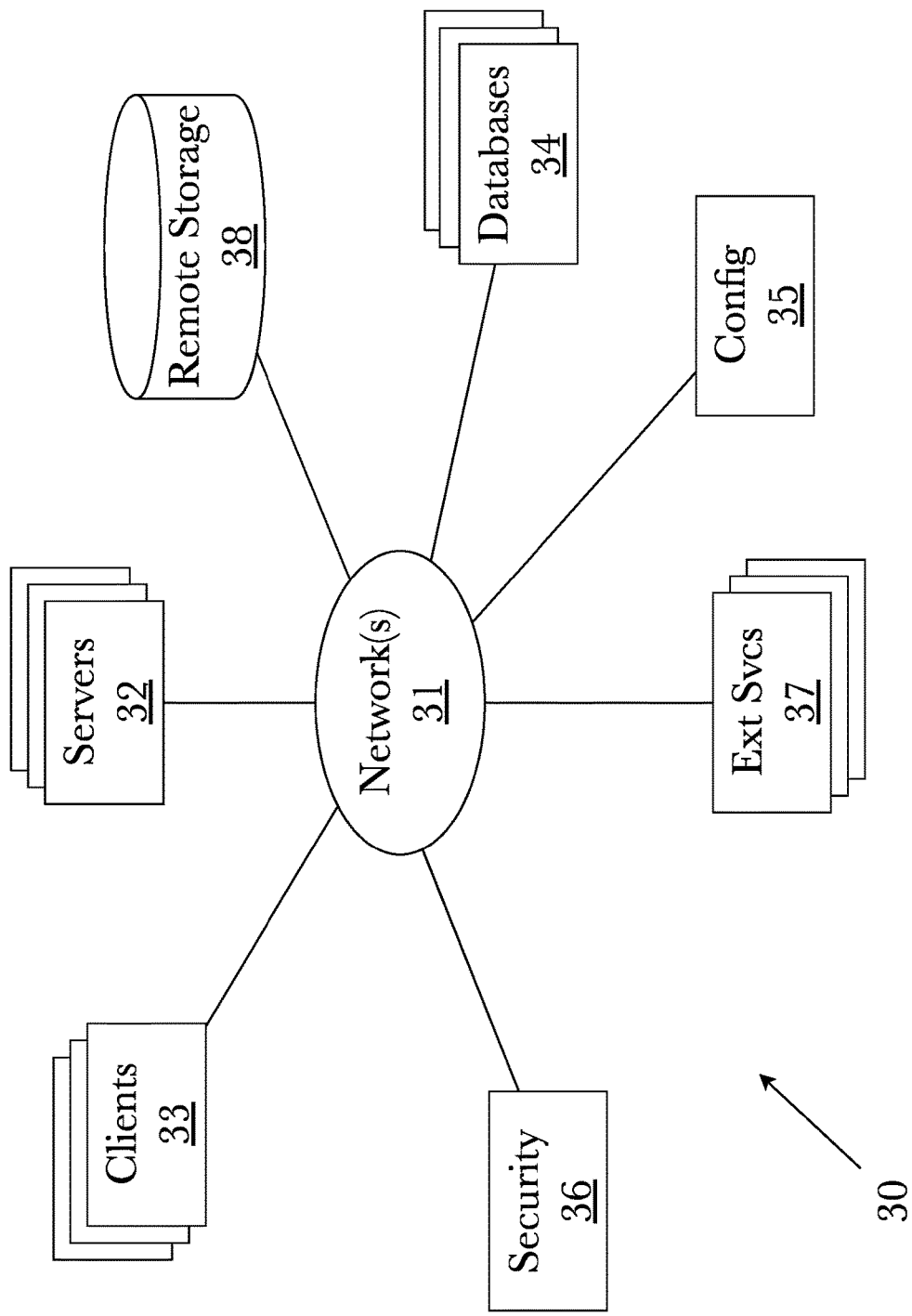
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
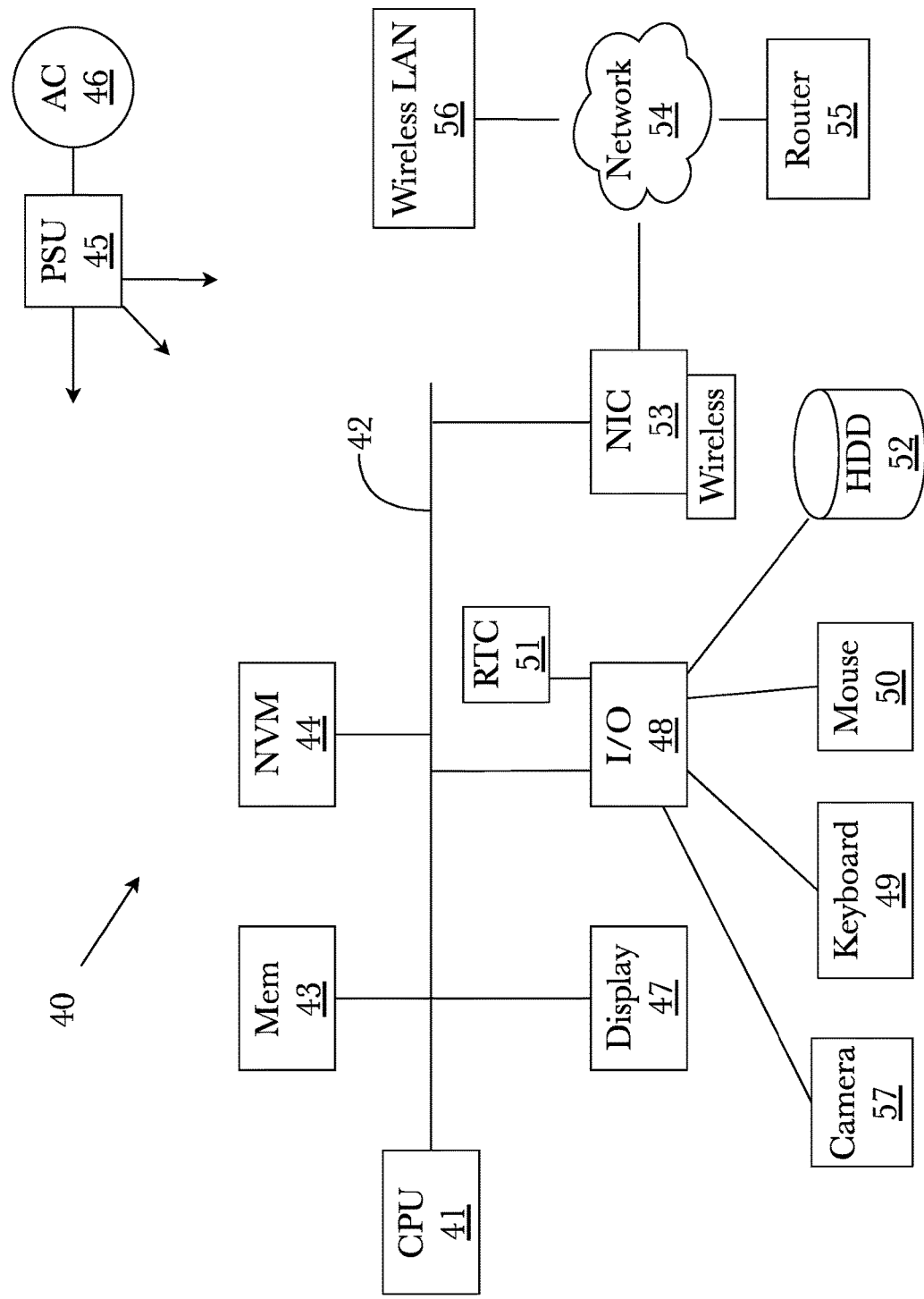
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for zero-step user recognition and biometric access control, comprising:
   at least one of either or both of an audio or video input device; and
   a database configured to store a plurality of user profiles, wherein each of the plurality of user profiles comprises at least a biometric template and a photograph of the user; and
   a biometrics verification server comprising a first memory, a first processor, and a first plurality of programming instructions stored in the first memory, and operating on the first processor, wherein the first plurality of programming instructions, when operating on the first processor, cause the biometrics verification server to:
      receive audio data and image data associated with a user from the input device over a network;
      process the received audio data as behavioral biometric data;
      process the received image data as physiological biometric data;
      extract unique facial features from the physiological biometric data, the extracted facial features comprising a first set of user-specific biometric characteristic data;
      extract unique speech features from the behavioral biometric data, the extracted speech features comprising a second set of user-specific biometric characteristic data;
      compare the first set of user-specific biometric characteristic data with the plurality of photographs stored in the database;
         if the first set of user-specific biometric characteristic data does not match any stored photographs, create a new user profile and store the first set of user-specific biometric characteristic data in a biometric template associated with the new user profile; or
         if the first set of user-specific biometric characteristic data does match a stored photograph, retrieve a biometric template associated with the matched photograph; and
      indicate a positive or negative physiological match;
      compare the second set of user-specific biometric characteristic data with the biometric template associated with the matched photograph;
         if the second set of user-specific biometric characteristic data does not match any stored photographs, indicate a negative behavioral match; or
         if the first set of user-specific biometric characteristic data does match a stored biometric template, indicate a positive behavioral match; and
      responsive to the indication of the positive physiological match and the positive behavioral match, confirm the user's identity.

2. The system of claim 1, wherein the first set of user-specific biometric characteristic data comprises information about the distance between the user's eyes, the depth of the user's eye sockets, the distance from the user's forehead to chin, the shape of the user's cheekbones, and the contours of the user's lips, ears, and chin.

3. The system of claim 1, wherein the second set of user-specific biometric characteristic data comprises information about the pitch, loudness, tone, and frequency range of a user's voice.

4. The system of claim 1, further comprising a payment facilitation device comprising a second memory, a second processor, and a second plurality of programming instructions stored in the second memory, and operating on the second processor, wherein the second plurality of programming instructions, when operating on the second processor, cause the payment facilitation device to:
   detect a registered wireless mobile device;
   establish a wireless connection with the registered wireless mobile device;
   obtain a device identifier for the registered wireless mobile device;
   send the device identifier to a payment facilitation server;
   receive the confirmation of user identity from the biometric verification server;
   retrieve the confirmed user's user profile from the database;
   display the photograph of the user associated with the registered wireless mobile device for visual confirmation of the identity of the customer;
   transmit transaction details to the registered wireless mobile device for approval, the transaction details comprising a transaction amount;
   receive authentication of the transaction details from the customer mobile device; and
   send the transaction details to the payment facilitation server for processing of the transaction.

5. The system of claim 4, further comprising the payment facilitation server comprising a third memory, a third processor, and a third plurality of programming instructions stored in the third memory, and operating on the third processor, wherein the third plurality of programming instructions, when operating on the third processor, cause the payment facilitation server to:
   receive the device identifier from the payment facilitation device;
   check the pre-paid account balance of the user associated with the registered wireless mobile device;
      if the account balance exceeds transaction amount, deduct the transaction amount from the account balance; or
         if the transaction amount exceeds the account balance, send the transaction details to a payment processor for processing.

6. The system of claim 1 further comprising a unified communications system which acts as a common intermediary device through which the payment facilitation device, the payment facilitation server, and registered wireless mobile device communicate.

7. The system of claim 1, wherein the at least one audio or video input device and biometrics verification server are all located on at least one computer device that is connected to a local network.

8. The system of claim 1, wherein the biometrics verification server receives input and sends output over the Internet.

9. The system of claim 1, wherein the confirmation of a user's identity is used to provide access to controlled materials.

10. The system of claim 9, where the controlled materials comprise at least one of a hardware, software, and physical location.

11. A method for zero-step user recognition and biometric access control, comprising the steps of:
   using at least one of either or both of an audio or video input device to capture audio data and image data;
   storing, in a database, a plurality of user profiles, wherein each of the plurality of user profiles comprises at least a biometric template and a photograph of the user;
   receiving audio data and image data associated with a user from the input device over a network;
   processing the received audio data as behavioral biometric data;
   processing the received image data as physiological biometric data;
   extracting unique facial features from the physiological biometric data, the extracted facial features comprising a first set of user-specific biometric characteristic data;
   extracting unique speech features from the behavioral biometric data, the extracted speech features comprising a second set of user-specific biometric characteristic data;
   comparing the first set of user-specific biometric characteristic data with the plurality of photographs stored in the database;
      if the first set of user-specific biometric characteristic data does not match any stored photographs, creating a new user profile and storing the first set of user-specific biometric characteristic data in a biometric template associated with the new user profile; or
      if the first set of user-specific biometric characteristic data does match a stored photograph, retrieving a biometric template associated with the matched photograph; and
   indicating a positive or negative physiological match;
   comparing the second set of user-specific biometric characteristic data with the biometric template associated with the matched photograph;
      if the second set of user-specific biometric characteristic data does not match any stored photographs, indicating a negative behavioral match; or
      if the first set of user-specific biometric characteristic data does match a stored biometric template, indicating a positive behavioral match; and
   responsive to the indication of the positive physiological match and the positive behavioral match, confirming the user's identity.

12. The method of claim 11, wherein the first set of user-specific biometric characteristic data comprises information about the distance between the user's eyes, the depth of the user's eye sockets, the distance from the user's forehead to chin, the shape of the user's cheekbones, and the contours of the user's lips, ears, and chin.

13. The method of claim 11, wherein the second set of user-specific biometric characteristic data comprises information about the pitch, loudness, tone, and frequency range of a user's voice.

14. The method of claim 11, further comprising the steps of:
   detecting a registered wireless mobile device;
   establishing a wireless connection with the registered wireless mobile device;
   obtaining a device identifier for the registered wireless mobile device;
   sending the device identifier to a payment facilitation server;
   receiving the confirmation of user identity from the biometric verification server;
   retrieving the confirmed user's user profile from the database;
   displaying the photograph of the user associated with the registered wireless mobile device for visual confirmation of the identity of the customer;
   transmitting transaction details to the registered wireless mobile device for approval, the transaction details comprising a transaction amount;
   receiving authentication of the transaction details from the customer mobile device; and
   sending the transaction details to the payment facilitation server for processing of the transaction.

15. The method of claim 14, further comprising steps of:
   receiving the device identifier from the payment facilitation device;
   checking the pre-paid account balance of the user associated with the registered wireless mobile device;
      if the account balance exceeds transaction amount, deducting the transaction amount from the account balance; or
         if the transaction amount exceeds the account balance, sending the transaction details to a payment processor for processing.

16. The method of claim 11 further comprising a unified communications system which acts as a common intermediary device through which the payment facilitation device, the payment facilitation server, and registered wireless mobile device communicate.

17. The method of claim 11, wherein the at least one audio or video input device and biometrics verification server are all located on at least one computer device that is connected to a local network.

18. The method of claim 11, wherein the biometrics verification server receives input and sends output over the Internet.

19. The method of claim 11, wherein the confirmation of a user's identity is used to provide access to controlled materials.

20. The method of claim 19, where the controlled materials comprise at least one of a hardware, software, and physical location.

* * * * *